United States Patent
Max

(10) Patent No.: US 6,733,667 B2
(45) Date of Patent: May 11, 2004

(54) DESALINATION USING POSITIVELY BUOYANT OR NEGATIVELY BUOYANT/ASSISTED BUOYANCY HYDRATE

(75) Inventor: Michael David Max, Washinton, DC (US)

(73) Assignee: Marine Desalination Systems L.L.C., Washington, DC (US)

( * ) Notice: Subject to any disclaimer, the term of this patent is extended or adjusted under 35 U.S.C. 154(b) by 0 days.

(21) Appl. No.: 10/266,258

(22) Filed: Oct. 8, 2002

(65) Prior Publication Data

US 2003/0024803 A1 Feb. 6, 2003

Related U.S. Application Data

(60) Division of application No. 09/397,500, filed on Sep. 17, 1999, now Pat. No. 6,497,794, which is a continuation-in-part of application No. 09/375,410, filed on Aug. 17, 1999, now Pat. No. 6,531,034, which is a continuation-in-part of application No. 09/350,906, filed on Jul. 12, 1999, now Pat. No. 6,565,715.

(51) Int. Cl.[7] .................................................. C02F 1/00
(52) U.S. Cl. .................. 210/177; 62/238.5; 62/240; 202/83; 210/181; 210/182; 210/195.1; 210/202; 210/205; 210/241; 210/258
(58) Field of Search ................ 62/239, 240, 238.5, 62/532, 583; 202/83, 121; 203/10, 100; 210/170, 177, 181, 182, 195.1, 202, 205, 241, 258; 585/15

(56) References Cited

U.S. PATENT DOCUMENTS

| | | | |
|---|---|---|---|
| 2,904,511 A | 9/1959 | Donath | |
| 2,974,102 A | 3/1961 | Williams | |

(List continued on next page.)

FOREIGN PATENT DOCUMENTS

| | | |
|---|---|---|
| JP | 55055125 | 4/1980 |
| JP | 58109179 | 6/1983 |
| JP | 59029078 | 2/1984 |
| JP | 61025682 | 2/1986 |
| JP | 11319805 | 11/1999 |
| JP | 2000202444 | 7/2000 |
| RU | 997715 | 2/1983 |
| RU | 1006378 | 3/1983 |
| WO | 1320134 | 6/1973 |
| WO | WO 01/04056 A1 | 1/2001 |
| WO | WO01/34267 A1 | 5/2001 |

OTHER PUBLICATIONS

Russian Abstract Publication No. 2166348, May 10, 2001, Mel'nikov et al.

Concentration Specialists, Inc., Andover, MA, "OWRT Freezing Pilot Plant Absorption freezing Vapor Compression (AFVC) 25,000 gpd," Wrightsville Beach, NC, NCSU, (Jan. 1982).

(List continued on next page.)

*Primary Examiner*—Peter A. Hruskoci
(74) *Attorney, Agent, or Firm*—Pillsbury Winthrop LLP

(57) ABSTRACT

Methods and apparatus for desalination of salt water (and purification of polluted water) are disclosed. Saline (or otherwise polluted) water is pumped to a desalination installation and down to the base of a desalination fractionation column, where it is mixed with hydrate-forming gas or liquid to form either positively buoyant (also assisted buoyancy) or negatively buoyant hydrate. The hydrate rises or sinks or is carried into a lower pressure area and dissociates (melts) into the gas and pure water. In preferred embodiments, residual salt water which is heated by heat given off during formation of the hydrate is removed from the system to create a bias towards overall cooling as the hydrate dissociates endothermically at shallower depths, and input water is passed through regions of dissociation in heat-exchanging relationship therewith so as to be cooled sufficiently for hydrate to form at pressure-depth. The fresh water produced by the system is cold enough that it can be used to provide refrigeration, air conditioning, or other cooling; heat removed from the system with the heated residual water can be used for heating or other applications. In other embodiments, desalination or other purification is carried out in "artificially" or mechanically pressurized vessels, which embodiments may be comparatively mobile.

9 Claims, 19 Drawing Sheets

U.S. PATENT DOCUMENTS

| | | |
|---|---|---|
| 3,027,320 A | 3/1962 | Buchanan |
| 3,119,771 A | 1/1964 | Cottle |
| 3,119,772 A | 1/1964 | Hess et al. |
| 3,126,334 A | 3/1964 | Harlow |
| 3,132,096 A | 5/1964 | Walton |
| 3,148,143 A | 9/1964 | Donath |
| 3,155,610 A | 11/1964 | Williams |
| 3,171,727 A | 3/1965 | Brown et al. |
| 3,214,371 A | 10/1965 | Tuwiner |
| 3,217,505 A | 11/1965 | Tuwiner |
| 3,243,966 A | 4/1966 | Glew |
| 3,308,063 A | 3/1967 | Hess et al. |
| 3,350,299 A | 10/1967 | Hess et al. |
| 3,350,300 A | 10/1967 | Hess et al. |
| 3,371,035 A | 2/1968 | Jacobs et al. |
| 3,675,436 A | 7/1972 | Ganiaris |
| 3,712,075 A | 1/1973 | Smith et al. |
| 3,813,892 A | 6/1974 | Johnson et al. |
| 3,856,492 A | 12/1974 | Klass |
| 3,892,103 A | 7/1975 | Antonelli |
| 3,983,032 A | 9/1976 | Hess et al. |
| 3,992,170 A | 11/1976 | Karnofsky |
| 4,170,328 A | 10/1979 | Kirk et al. |
| 4,207,351 A | 6/1980 | Davies |
| 4,267,022 A | 5/1981 | Pitcher |
| 4,272,383 A | 6/1981 | McGrew |
| 4,278,645 A | 7/1981 | Filss |
| 4,376,462 A | 3/1983 | Elliott et al. |
| 4,392,959 A | 7/1983 | Coillet |
| 4,424,858 A | 1/1984 | Elliott et al. |
| 4,643,832 A | 2/1987 | Iniotakis et al. |
| 4,652,375 A | 3/1987 | Heilweil et al. |
| 4,670,159 A | 6/1987 | Garrett et al. |
| 4,678,583 A | 7/1987 | Willson, III et al. |
| 4,686,833 A | 8/1987 | Hino et al. |
| 4,696,338 A | 9/1987 | Jensen |
| 4,718,242 A | 1/1988 | Yamauchi et al. |
| 4,767,527 A | 8/1988 | Iniotakis et al. |
| 4,821,794 A | 4/1989 | Tsai et al. |
| 5,037,555 A | 8/1991 | Pasternak et al. |
| 5,055,178 A | 10/1991 | Sugier et al. |
| 5,076,934 A | 12/1991 | Fenton |
| 5,110,479 A | 5/1992 | Frommer et al. |
| 5,128,042 A | 7/1992 | Fenton |
| 5,159,971 A | 11/1992 | Li |
| 5,167,838 A | 12/1992 | Wilensky |
| 5,304,356 A | 4/1994 | Iijima et al. |
| 5,362,467 A | 11/1994 | Sakai et al. |
| 5,364,611 A | 11/1994 | Iijima et al. |
| 5,397,553 A | 3/1995 | Spencer |
| 5,444,986 A | 8/1995 | Hino |
| 5,448,892 A | 9/1995 | Cheng |
| 5,473,904 A | 12/1995 | Guo et al. |
| 5,497,630 A | 3/1996 | Stein et al. |
| 5,512,176 A | 4/1996 | Blair |
| 5,553,456 A | 9/1996 | McCormack |
| 5,562,891 A | 10/1996 | Spencer et al. |
| 5,660,603 A | 8/1997 | Elliot et al. |
| 5,679,254 A | 10/1997 | Chakrabarti |
| 5,816,057 A | 10/1998 | Dickey et al. |
| 5,873,262 A | 2/1999 | Max et al. |
| 6,028,234 A | 2/2000 | Heinemann et al. |
| 6,089,022 A | 7/2000 | Zednik et al. |
| 6,106,592 A | 8/2000 | Paranjpe et al. |
| 6,112,528 A | 9/2000 | Rigby |
| 6,158,239 A | 12/2000 | Max |
| 6,180,843 B1 | 1/2001 | Heinemann et al. |
| 6,245,955 B1 | 6/2001 | Smith |
| 6,296,060 B1 | 10/2001 | McCaslin |
| 6,475,460 B1 * | 11/2002 | Max .................... 423/437.1 |
| 6,497,794 B1 * | 12/2002 | Max .................... 203/10 |

OTHER PUBLICATIONS

Chicago Bridge and Iron Company (CBI), "OWRT Freezing Pilot Plant Falling Film Indirect Freezing 6,000 gpd," CBI Test Facility Oakbrook, IL (Jan. 1982).

Wiegandt, "Desalination by Freezing," School of Chemical Engineering, Cornell Universtiy, Ithaca, NY, pp 1–46, (Mar. 1990).

W. J. Hahn, "Present Status of the Office of Saline Water Freezing Process Program," Wrightsville Beach Test Facility, pp. 1–13 (DSP 6/11).

A.J. Barduhn, "Desalination by Freezing Processes," Encyclpedia of Chemical Processing and Design, vol. 14, pp. 361–386, (©1982).

Viahakis et al., "the Growth Rate of Ice Crystals: The Properties of 51 Gas Hydrates," Research and Development Progress Report No. 830, Dept. of Interior, PB–217–615, (Nov. 1972).

Campbell et al., "Gravity Wash Column Design, Procurement, and Installation: Followed by Development Tests of the Modified Singe–Stage Desalting Pilot Plant at Wrigthsville," Office of Water Research and Technology, Washington, D.C., W8100689 OWRT7514(1), Contract D1–14–34–001–7514, (1979) pp. 1–74.

Max et al., "Extraction of Methane from Oceanic Hydrate System Deposits," Offshore Technology Conference, Paper No. 10727, pp. 1–8 (1999).

Max and Lowrie, "Oceanic Methane Hydrates: A "Frontier" Gas Resource," *Journal of Petroleum Geology* vol. 19(1), pp. 41–56 (Jan. 1996).

Max and Dillon, "Oceanic Methane Hydrate: The Character of the Blake Ridge Hydrate Stability Zone, and the Potential for Methane Extraction," *Journal of Petroleum Geology*, vol. 21(3), pp. 343–358 (Jul. 1998).

Max, M.D., "Oceanic Methane Hydrate: The character of the Blake Ridge Hydrate Stability Zone, and the Potential for Methane Extraction," author's correction, *Journal of Petroleum Geology*, vol. 22(2), pp. 227–228 (Apr. 1999).

Max and Lowrie, "Oceanic Methane Hydrate Development: Reservoir Character and Extraction," Offshore Technology Conference, Paper No. 8300, pp. 235–240 (1997).

Max et al., "Methane Hydrate, A Special Clathrate: Its Attributes and Potential," *Naval Research Laboratory*, NRL/MR/6101–97–7926, pp. 1–74 (Feb. 28, 1997).

Max and Chandra, "The dynamic Oceanic Hydrate System: Production Constraints and Strategies," Offshore Technology Conference, Paper No. 8684, pp. 1–10 (1998).

Patent Abstracts of Japan, vol. 2000, No. 02, Feb. 29, 2000 and JP 11319805A, Nov. 24, 1999 (abstract).

Database WPI, Section Ch, Week 1988 12, Derwent Publications Ltd., London, GB; AN 1988–082320, XP002143497 & SU 1 328 298 A (Odessa Refrig Ind Res), Aug. 7, 1987, (abstract).

EPO—Patent Abstracts of Japan, Publication No. 11319805, Publication Date: 224–11–99, Separation of Gaseous language abstract.

XP–002143497 SU 1328298 English language abstract.

Rautenbach etal., Entiwicklung und Optimierung eines Hydrat–Verfahrens zur Meerwasserentsalzung, Chemie-–Ing.–Techn 45 jahrg. 1973/Nr. 5, pp. 259–254.

Siliber, Methane Cooled Destination Method and Apparatus, USPTO, Defensive Publication T939,007—Published Oct. 7, 1975.

Japanese Abstract, Journal No. G0941AAK ISSN No: 0453–0683, 1995, vol. 42, No. 7, Accesson No: 95A0492545, File Segment: JICST-E.

EPO—Patent Abstracts of Japan Publication No. 611368481, Publication date Jun. 24, 1984, Muneschichi, Concentration of Aqueous Solution English language abstract.

* cited by examiner

US 6,733,667 B2

DESALINATION USING POSITIVELY BUOYANT OR NEGATIVELY BUOYANT/ASSISTED BUOYANCY HYDRATE

This is a Divisional of application Ser. No. 09/397,500, filed Sep. 17, 1999 (now U.S. Pat. No. 6,497,794 which is a Continuation-in-Part of application Ser. No. 09/375,410, filed Aug. 17, 1999 (now U.S. Pat. No. 6,531,034, which is a Continuation-in-Part of application Ser. No. 09/350,906, filed Jul. 12, 1999 (now U.S. Pat. No. 6,565,715), the entire contents of each Application being incorporated herein by reference.

FIELD OF THE INVENTION

In general, the invention relates to desalination or other purification of water using gas or liquid hydrates to extract fresh water from saline or polluted water. In particular, the invention relates to desalination or purification of saline or polluted water using methodologies which are virtually self-sustaining and which produce a cold water output that is suitable for refrigeration. The methodologies may be practiced in land-based installations or, in some cases, on mobile platforms.

BACKGROUND OF THE INVENTION

In general, desalination and purification of saline or polluted water using buoyant gas hydrates is known in the art. See, for example, U.S. Pat. No. 5,873,262 and accepted South African Patent Application No. 98/5681, the disclosures of which are incorporated by reference. According to this approach to water desalination or purification, a gas or mixture of gases which spontaneously forms buoyant gas hydrate when mixed with water at sufficiently high depth-induced pressures and/or sufficiently low temperatures is mixed with water to be treated at the relatively deep base of a treatment column. According to prior technology, the treatment column is located at sea. Because the hydrate is positively buoyant, it rises though the column into warmer water and lower pressures. As the hydrate rises, it becomes unstable and disassociates into pure water and the positively buoyant hydrate-forming gas or gas mixture. The purified water is then extracted and the gas is processed and reused for subsequent cycles of hydrate formation. Suitable gases include, among others, methane, ethane, propane, butane, and mixtures thereof.

The previously known methods of desalination or purification using buoyant gas hydrates rely on the naturally high pressures and naturally low temperatures that are found at open ocean depths below 450 to 500 meters when using pure methane, or somewhat shallower when using mixed gases to enlarge the hydrate stability "envelope," and the desalination installations have been essentially immobile once constructed. In certain marine locations such as the Mediterranean Sea, however, the water is not cold enough for the requisite pressure to be found at a shallow enough depth; this would necessitate using a much longer column, which is impractical. Moreover, many places where fresh water is at a premium are located adjacent to wide, shallow water continental shelves where a marine desalination apparatus would have to be located a great distance offshore. Furthermore, a fixed installation is somewhat less versatile than a mobile installation would be. Additionally, the known methodologies have all required the hydrate, per se, to be buoyant in order to collect the hydrate and the fresh water released therefrom in an efficient manner.

SUMMARY OF THE INVENTION

The various inventions disclosed herein overcome one or more of these limitations and greatly expand use of the hydrate desalination fractionation method by providing for land-based or mobile installation-based desalination of seawater (or other purification of polluted water) that is supplied to the installation using either positively or negatively buoyant hydrate. The methods of the invention can be employed where input water is too warm or where suitably deep ocean depths are not available within reasonable distances for ocean-based desalination to be performed using gas hydrate, and may be carried out using a gas or gas mixture or even a liquid which produces either positively or negatively buoyant hydrate.

The inventive methods entail cooling the seawater to sufficiently low temperatures for hydrate to form at the bottom of a desalination fractionation column at pressure-depths and temperatures appropriate for the particular hydrate-forming material being used. A preferred embodiment capitalizes on the property of the hydrate that the amount of heat given off during formation of the hydrate at depth is essentially equal to the amount of heat absorbed by the hydrate as it disassociates (melts) back into pure water and a hydrate-forming material. In particular, as liquid or gas forms hydrate, and as the hydrate crystals rise through the water column (either due to inherent buoyancy of the hydrate or "assisted" by gas trapped within a hydrate mesh shell) and continue to grow, heat released during formation of the hydrate will heat the surrounding seawater in the column. As the hydrate rises in the water column and pressure on it decreases, the hydrate dissociates endothermically—the hydrate formation is driven primarily by the increased pressure at depth—and absorbs heat from the surrounding water column. Ordinarily, the heat energy absorbed during dissociation of the hydrate would be essentially the same heat energy released during exothermic formation of the hydrate such that there would be essentially no net change in the amount of heat energy in the system.

According to the invention, however, heat energy that is liberated during formation of the hydrate is removed from the system by removing residual saline water from the water column, which residual saline water has been heated by the heat energy released during exothermic formation of the hydrate. Because formation of the hydrate is primarily pressure driven (as opposed to temperature driven), the hydrate becomes unstable under reduced pressures as it rises through the water column, and it dissociates endothermically. Because some heat energy released during exothermic crystallization has been removed from the system, the hydrate will absorb heat from other sources as it melts, thereby creating a cooling bias. The preferred embodiment of the invention capitalizes on this cooling bias by passing the source water through the dissociation region of the water column, in heat-exchanging relationship therewith, so as to cool the source or supply water to temperatures sufficiently low for hydrate to form at the base of the installation.

As noted above, the invention may be practiced using liquid, gas, or gas mixtures which produce either positively buoyant hydrate or negatively buoyant hydrate. In the case of positively buoyant hydrate, the hydrate crystals themselves are positively buoyant and will rise naturally upon formation, upwardly through a desalination fractionation column at the top of which the hydrate disassociates into fresh water and the gas or gas mixture. In the case of negatively buoyant hydrate, on the other hand, the hydrate crystals, per se, are denser than the surrounding seawater and therefore ordinarily would tend to sink. By controlling the injection of the gas (or gas mixture) or liquid which produces the hydrate such that hydrate formation is incomplete, bubbles of the gas or the less-dense-thanseawater liquid are trapped within a mesh shell of hydrate, and overall positive buoyancy of the shell will cause the hydrate to rise within the water column.

Preferably, the rising assisted-buoyancy hydrate (negatively buoyant hydrate intimately intermixed with positively buoyant gas or liquid bubbles) is diverted laterally over a "catch basin" so that the hydrate does not fall back down to the formation portion of the desalination fractionation column once the mesh shell disintegrates during dissociation. Solid, negatively buoyant hydrate, which has settled to a catch sump at the base of the apparatus, is pumped to the top of the catch basin, where it dissociates into gas and fresh water. (If so desired, forming the negatively buoyant hydrate in a slightly different manner will cause all the hydrate to settle in the sump, from which it is pumped to the dissociation/heat exchange catch basin.)

In alternative embodiments of the invention, the input water may or may not be passed through the dissociating hydrate in heat-exchanging relationship therewith to be cooled. In either case, the input water is (further) cooled using other, artificial means of refrigeration, the degree to which such cooling is necessary being in part a function of the buoyant or non-buoyant nature of the hydrate. Some heat energy is removed from the system by removing warmed water which has circulated around the desalination fractionation column in a water jacket and which has been heated by heat released during hydrate formation.

In the various embodiments of the invention, the purified water will be extremely cool. Advantageously, this cooled water, which preferably will be used as potable water, can itself be used as a heat sink to provide cooling, e.g., refrigeration as a basis for air conditioning in hot climates.

An additional advantage of land-based desalination or water purification according to the invention is that the installation is not subject to disturbances caused by foul weather and bad sea conditions nearly to the same extent as a marine site might be. Additionally, access to an installation on land is far easier than access to a marine-based installation. Gas handling and storage facilities are more practicable on land, where there is more space and a more secure engineering environment available. Construction is easier on land, and security may be improved as compared to a marine-based installation.

Moreover, because considerable amounts of residual seawater may be extracted from the system (to remove heat energy from the system), the hydrate slurry will be concentrated. This means that there will be less saline water in the upper, dissociation regions of the dissociation fractionation column, and therefore there will be less residual seawater for the hydrate to mix with as it dissociates. Thus, less salt will be present to contaminate the fresh water produced by dissociation of the hydrate.

Furthermore, because the residual seawater preferably is recirculated through the desalination fractionation column one or more times, other components such as trace elements which are in the seawater (e.g., gold) may be concentrated so that recovery from the seawater becomes practical. Additionally, the concentrated seawater may itself be useful or desirable. For example, marine aquarists might purchase such concentrated seawater to use for mixing replacement water for their aquaria, and such concentrated seawater would facilitate recreating the specific microcosm from which it was extracted.

In further embodiments, the desalination installation is constructed so that the hydrate dissociation occurs while the hydrate is still at some depth, such that it is still under considerable pressure, and the hydrate-forming gas is captured at this depth and processed for re-use while still at such pressures. Considerable efficiencies of operation are obtained with such arrangements.

In still further embodiments of the invention, rather than relying on the weight of a long column of water to create pressures appropriate for hydrate formation, the inventive methods may be practiced using self-contained, sealed hydrate formation/separation and hydrate dissociation/heat exchange vessels, which vessels are mechanically pressurized using appropriate hydraulic pumping systems. Such mechanically pressurized installations are comparatively mobile and may be used to provide the benefits of the invention in highly diverse settings.

BRIEF DESCRIPTION OF THE DRAWINGS

The invention will now be described in greater detail in connection with the drawings, in which.

DETAILED DESCRIPTION OF PREFERRED EMBODIMENTS

Figure 1:
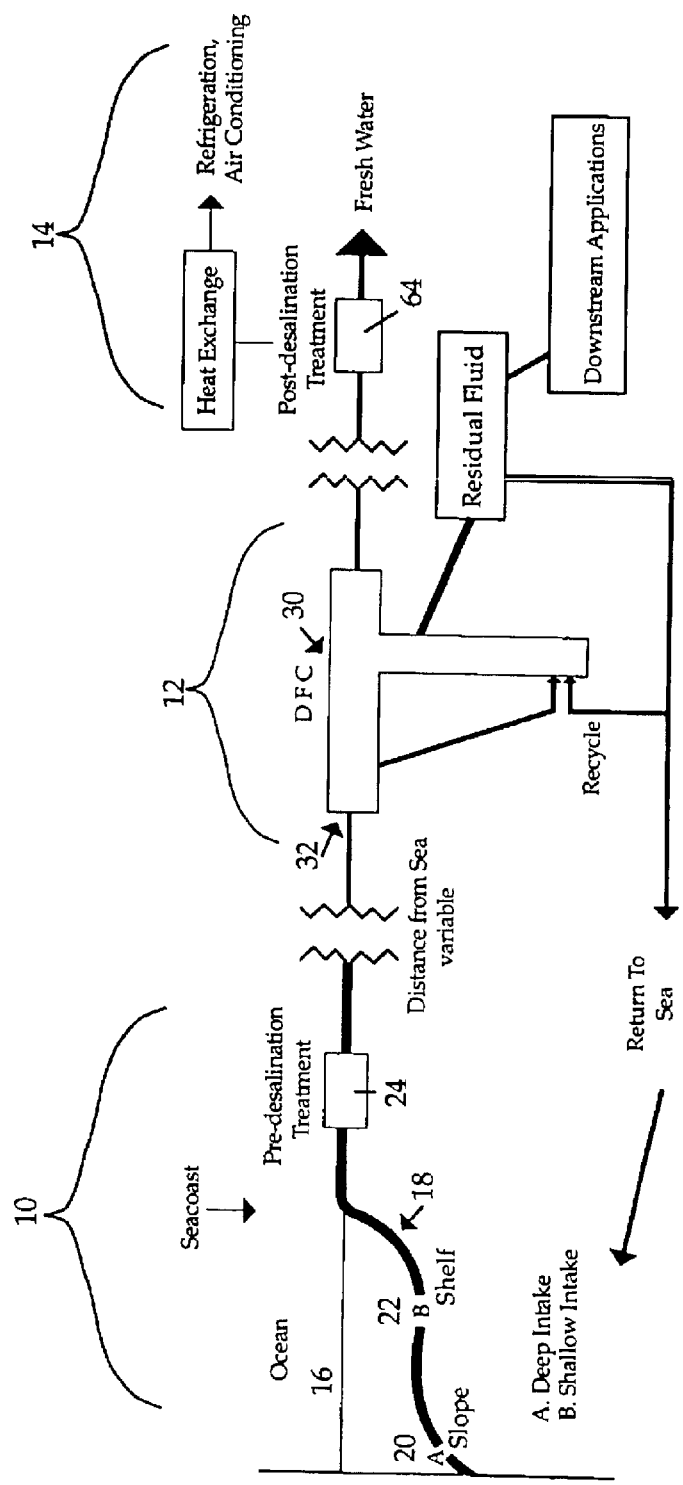
FIG. 1 is a generalized, diagrammatic depiction of a land-based desalination installation.

A land-based desalination installation is shown schematically in FIG. 1 in generalized fashion. The installation may be divided roughly into three sections or regions: an intake portion 10; a water purification portion 12; and post-processing and downstream usage section 14.

The intake portion 10 consists essentially of the apparatus and various subinstallations necessary to extract seawater from the ocean 16 and transport it to the desalination/purification installation at region 12, including subaquatic water intake piping 18 and pumping means (not shown) to draw the water from the ocean and pump it to shore for subsequent processing. Large volume installations can be located relatively close to the sea to reduce the piping distance of the input water to a minimum, and establishing the installation as close to sea level as possible will reduce the cost of pumping against pressure head.

The intake pipeline 18 preferably extends sufficiently out to sea that it draws deep water, e.g., from the slope 20 of the continental shelf because deep water is more pure and colder than shallow water. Alternatively, water may be drawn from locations closer to land, e.g., from areas on the continental shelf 22 where the distance across the shallow water is too great for practice. The precise depth from which water is drawn will ultimately be determined by a number of factors, including primarily the specific embodiment of the desalination fractionation column which is employed, as described below. Ideally, the desalination installation, per se, is located so that the highest part of the fluid-handling system is at or below sea-level to reduce the costs of intake pumping.

Additionally, the water may be pretreated at a pretreatment station 24. Pretreatment consists mainly of de-aeration, filtering to remove particulate matter and degassing, consistent with the requirement that material necessary for hydrate nucleation and growth not be removed from the water.

Figure 2:
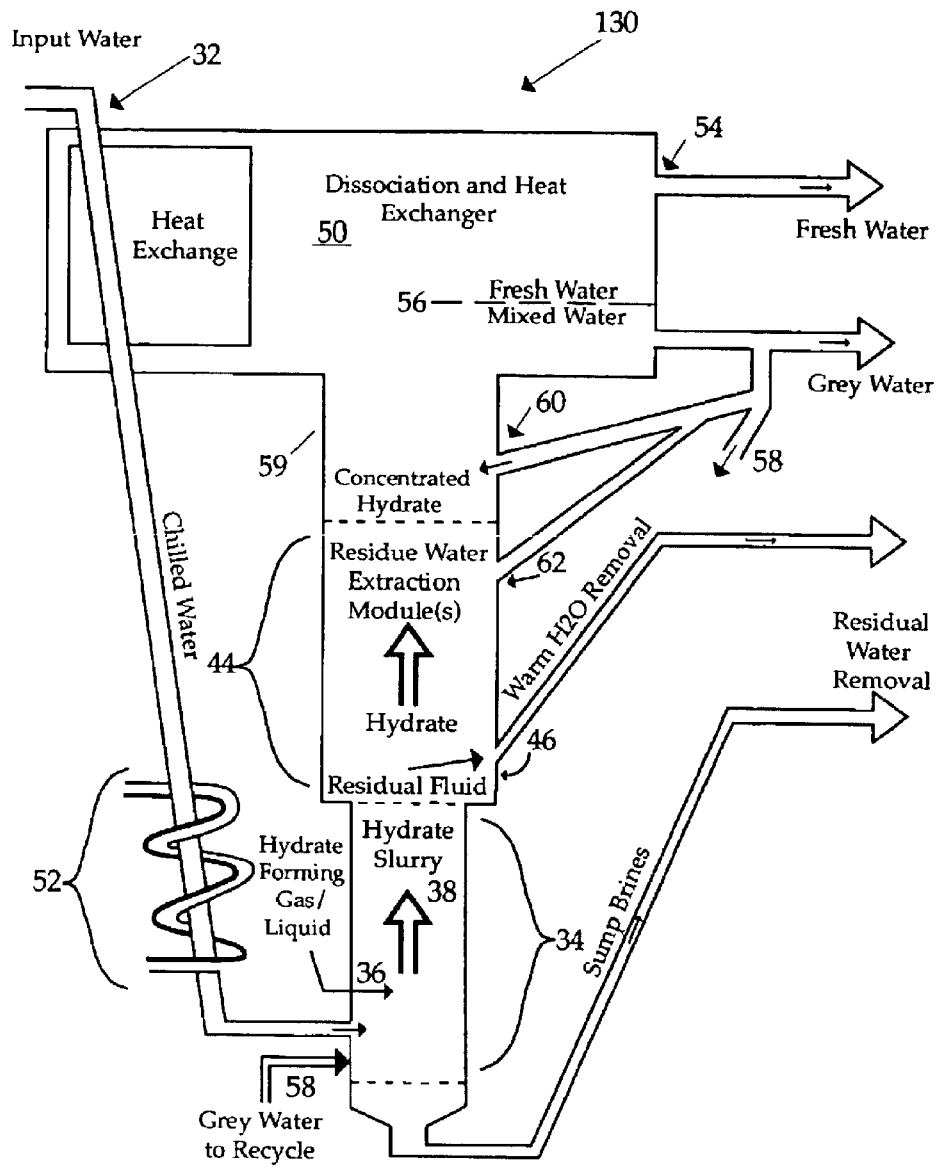
FIG. 2 is a diagrammatic, side elevation view of an embodiment of a desalination fractionation column which utilizes positively buoyant hydrate and which may be employed in the installation shown in FIG. 1.
Figure 3:
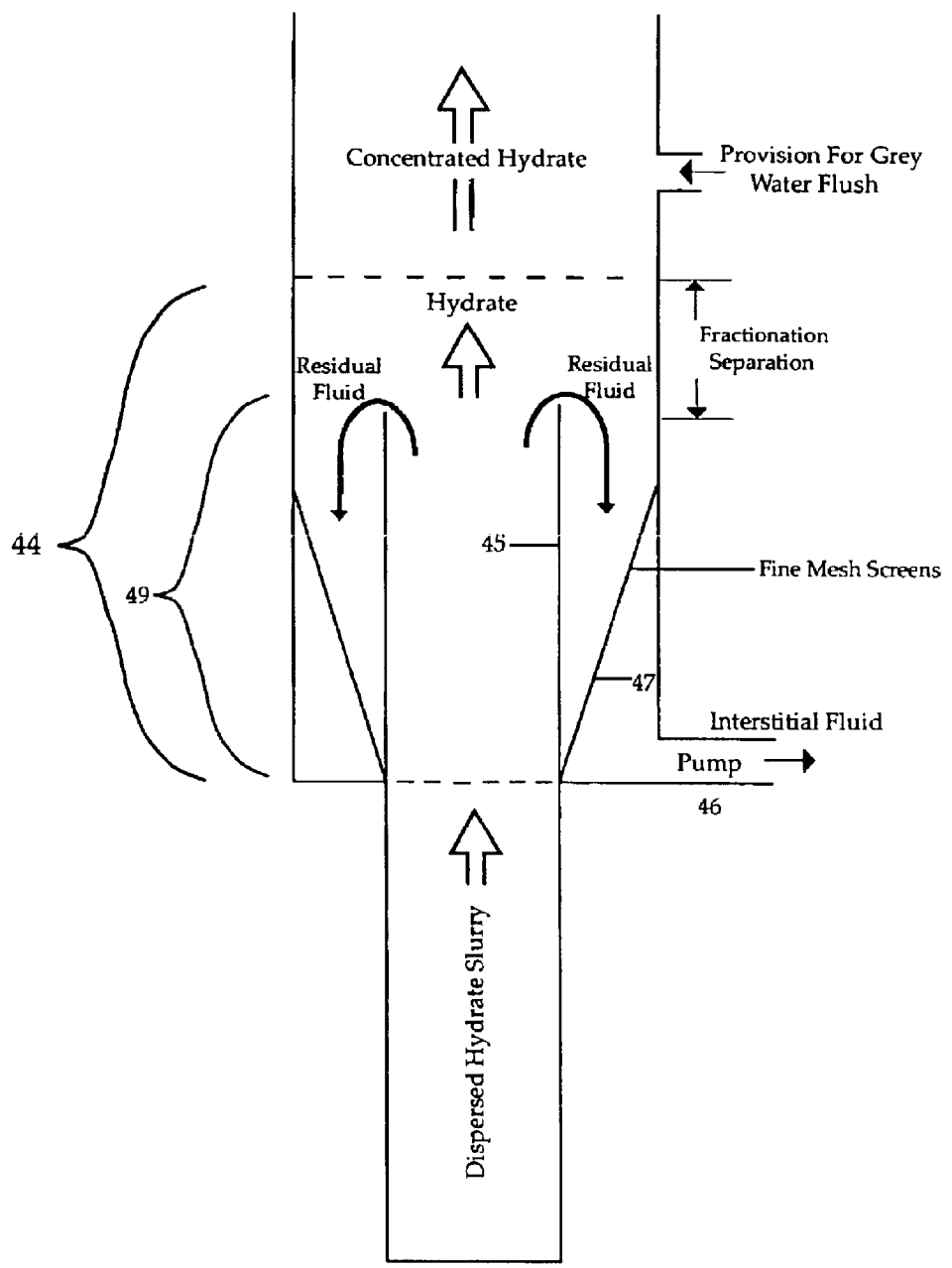
FIGS. 3 and 4 are diagrammatic, side elevation views showing two alternative heat extraction portions of a desalination fractionation column employed in the installation shown in FIG. 1.
Figure 4:
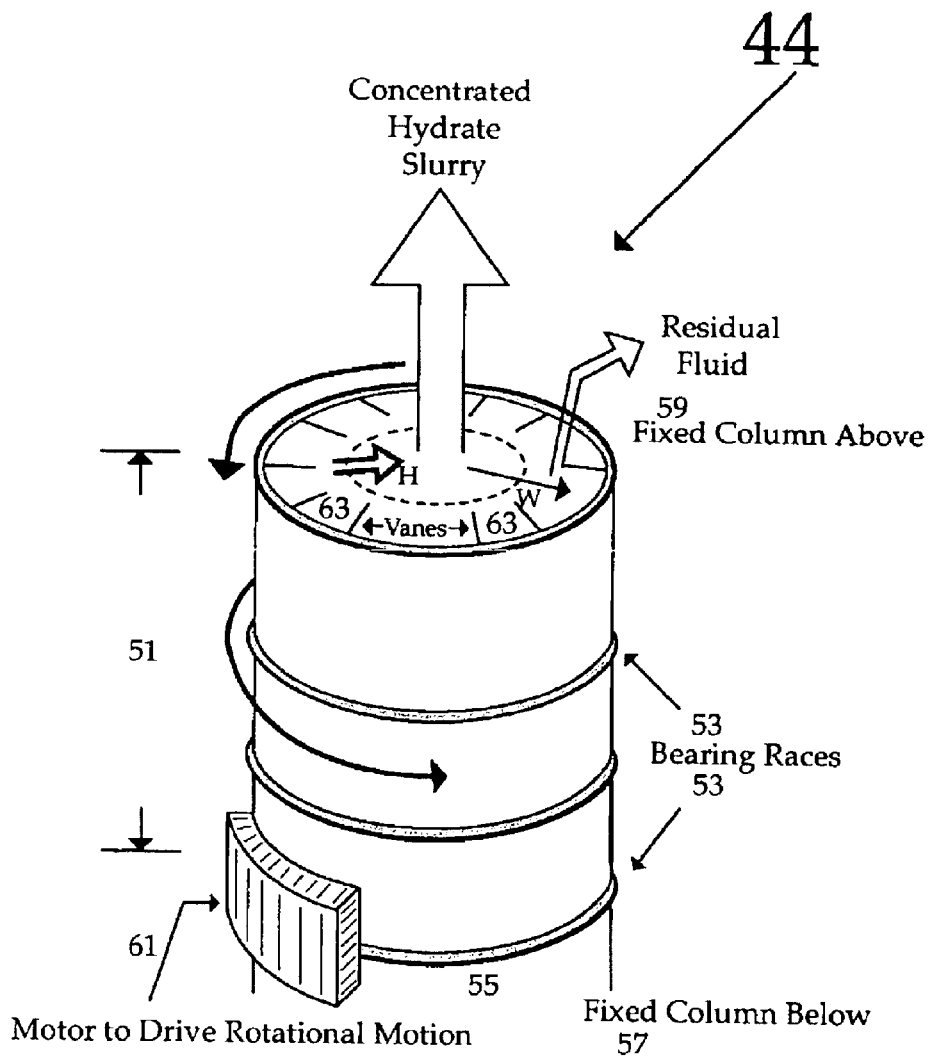

A preferred embodiment of the purification installation 30, per se, is illustrated in FIGS. 2, 3, and 4, which embodiment utilizes positively buoyant hydrate to extract fresh water from seawater. Seawater is pumped into the installation 130 at water input 32 and is pumped down to the lower, hydrate formation section 34 of the installation. The bottom of the hydrate formation section is no more than about 800 meters deep, and perhaps even shallower (again depending on the particular gas or gas mixture being used). A suitable, positively buoyant hydrate-forming gas (or liquid) is injected into the hydrate formation section at 36, and positively buoyant hydrate 38 spontaneously forms and begins to rise through the water column, as is known in the art.

The hydrate-forming gas can be pumped using sequential, in-line, intermediate pressure pumps, with the gas conduit extending either down through the fractionation column, per se, or down through the input water line so that gas line pressure is counteracted by ambient water pressure. As a result, it is not necessary to use expensive, high pressure gas pumps located on the surface. Alternatively, once a gas has been liquified, it can be pumped to greater depths without further significant compression.

Hydrate formation (crystallization) is an exothermic process. Accordingly, as the positively buoyant hydrate forms and rises automatically through the water column—forming a hydrate "slurry" as hydrate crystals continue to nucleate and grow as they rise, until the hydrate-forming gas is used up—the surrounding water, which will increasingly become a concentrated saline "residue," will be heated by the heat energy released during crystallization of the hydrate.

Below a certain salinity, the heated residual seawater will have a relatively decreased density and will rise in the column along with the hydrate 38. When the salinity of the residual seawater rises high enough due to the extraction of fresh water from it, however, the highly saline residual seawater will sink to the bottom of the water column. This highly saline residual seawater is collected in sump 40 at the bottom of the fractionation column and is removed.

As the slurry of hydrate and heated residual seawater rises in the fractionation column, heated residual seawater is removed from the system in heat extraction portion 44 of the fractionation column at one or more points 46. The heat extraction section 44 is shown in greater detail in FIG. 3. As illustrated in FIG. 3, for one mode of separation of hydrate and slurry, water is pumped from the system as part of the vertical fractionation process. This is accomplished through a two-stage process. An internal sleeve 45 allows a primary separation to take place, as a water trap 49 is formed below the top of the sleeve. Hydrate continues to rise, while water floods the entire section 44. Water is pumped from below the level at which hydrate exits from the top of the sleeve through fine conical screens 47. These are designed to obstruct the passage of particulate hydrate. (The screens can be heated periodically to clear them of hydrate when flow restriction exceeds design limits.) Residual water is drawn off at a slow enough rate that any hydrate that may reside within water drawn toward the screen has a greater tendency to rise buoyantly than the tendency toward downwards or sideways movement associated with the force of suction of the drawn-off water. Very buoyant gas rises and stays within the column.

An alternative configuration 44' of the heat extraction zone is shown in FIG. 4. In this configuration, a centrifuge is used to allow a separate, mechanically-driven density fractionation system to operate. In this configuration, a segment 51 of the column is made mobile and capable of rotary movement. The mobile, rotary centrifuge column segment is carried by bearings 53 at the base 55 and at intervals along its height to keep it in vertical alignment with the entirety of the column, and to allow it to rotate with respect to the portions 57, 59 of the column above and below it. This section is motor-driven, using a hydraulic system 61 driven from the surface. Vanes 63 within the centrifuge section will cause the water column to rotate, which vanes are designed based on turbine vane design to cause the hydrate-residual water in the section to rotate without turbulence and with increasing velocity toward the top of the section where residual water is extracted. Gravity "settling" or fractionation works here in a horizontal plane, where the heavier residual water "settles" toward the sides of the column while the lighter, more buoyant hydrate "settles" toward the center of the column. The hydrate continues to rise buoyantly and concentrates in the center of the centrifuge section. It will be appreciated that more than one such centrifuge section may be employed.

As the hydrate rises into the upper, dissociation and heat exchange region 50 of the desalination fractionation column, the depth-related pressures which forced or drove formation of the hydrate dissipate; accordingly, the hydrate, which is substantially in the form of a slurry, will be driven to dissociate back into the hydrate-forming gas (or mixture of gases) and fresh water. However, regardless of the particular method used to extract the warmed residual seawater, heat energy in the surrounding seawater which ordinarily (i.e., in the prior art) would be absorbed by the hydrate as it dissociates is no longer available to the hydrate. Therefore, because heat has been removed from the system by extracting warmed residual seawater in the heat extraction portion 44 of the apparatus, a net or overall cooling bias is created in the upper, dissociation and heat exchange portion 50 of the installation.

This cooling bias is capitalized upon to significant advantage. In particular, as indicated schematically in FIG. 2, water being pumped into the system (at 32) is passed in heat exchanging relationship through the regions of dissociating hydrate. For example, it is contemplated that the dissociation and heat exchange portion 50 may be constructed as one or more large, individual enclosures on the order of one hundred meters across. The input water will pass via a series of conduits through the regions of dissociating hydrate and will be cooled significantly as it does so. In fact, although some initial refrigeration will be required at start-up of the process, which initial refrigeration may be provided by heat exchange means 52, the installation eventually will attain a steady-state condition in which the amount of heat energy transferred from the input water to the dissociating hydrate is sufficient to cool the input water to temperatures appropriate for spontaneous formation of hydrate at the particular depth of the dissociation column.

Ideally, the input water is stabilized at 4° C. or below. This is because below that temperature, the density of the water increases, which enhances separation of the hydrate-water slurry formed by injections of the gas. Additionally, at a given pressure, hydrate nucleation proceeds faster at colder water temperatures. During the start-up period, the system is run in a mode of maximum warm fluid extraction (to create a state of induced thermal bias) before equilibrium or steady-state is reached; although the duration of this startup period will vary depending on the particular installation parameters, the design goal is that once steady-state is reached, the system can be run for extremely long operating periods without being shut down, i.e., periods on the order of years. Controlling residue water extraction, and thus heat removal, maintains a steady-state condition so that the apparatus does not keep cooling to below steady-state operating conditions.

Once the hydrate has dissociated into its constituent fresh water and gas or gases, the fresh water is pumped off, e.g. as at 54, and the gas is captured and recycled. (Provisions may be made for liquifying certain gases where this is desired.) Additionally, a portion of the water in the dissociation and heat exchange region 50 will be "gray water," which is fresh water containing some small portion of salts that have been removed from the hydrate by washing of the hydrate with water. The distinction between the "gray" or mixed water and pure fresh water is indicated schematically by dashed line 56. The gray water may be suitable for drinking, depending on the salt concentration, or for agricultural or industrial use without further processing. The cold, gray water may be recycled back into the fractionation column, either by pumping it back down to the hydrate formation section 34, as indicated at 58; or it may be injected back into the concentrated hydrate slurry at a region of the fractionation column located above the heat extraction portion 44, as indicated at 60, to increase the fluid nature of the hydrate slurry and to aid in controlling overall thermal balance of the system. Furthermore, providing gray water at 62 to dilute residual interstitial fluid allows for pre-dissociation washing.

As further shown in FIG. 1, in the post-processing and downstream usage section 14, the fresh water preferably is treated by secondary treatment means 64. The secondary treatment means may include, for example, fine filtering, gas extraction, aeration, and other processing required to bring the water to drinking water standard.

Moreover, it is extremely significant that depending on operating parameters such as temperature of the source water, the amount of residual seawater extracted in the heat extraction section 44, dimensions of the installation, and other parameters such as viscosities of fluids within the system; buoyancy of the hydrate relative to all fluids within the system; salinity and temperature of residual water; the design output requirements of fresh water; salinity and temperature of input water; design cooling requirements; system inefficiencies affecting thermal balance; etc., the fresh water produced will be significantly cooled. This cooled water can be used to absorb heat from other applications or locations such as the insides of buildings, and hence can be used to provide refrigeration or provide for air-conditioning.

Finally, once the seawater has been cycled through the desalination fractionation column and downstream processing applications a desired number of times, the residual, concentrated seawater (which may be highly saline in nature) is simply pumped back to sea. Alternatively, it may be retained for those who desire it.

With respect to overall design, engineering, and construction considerations for the system, it is contemplated that the desalination fractionation column 130 will be on the order of 15 to 20 meters in diameter, or even larger. Conventional excavation and shaft-lining methodologies common to the mining and tunneling industry can be used in the construction of the column 130. Overall dimensions will be determined based on the total desired fresh water production desired and relevant thermodynamic considerations. For example, one cubic meter of methane hydrate has the capacity to warm about 90 to 100 cubic meters of water by about 1° C. as it forms, and that same cubic meter of hydrate has the capacity to cool about 90 to 100 cubic meters of water by about 1° C. as it dissociates. (Mixes of suitable gases have higher heats of fusion, which makes the process more efficient.) Required cooling therefore will, in part, determine hydrate production rates, and hence dimensions of the system and the choice of gas or gases to meet those production rates.

Preferably, the diameter of the residual fluid removal column segment is larger. This facilitates buoyant, upward movement of the hydrate through the water column while first allowing separation of residue water from the hydrate in the heat extraction region 44, and then dissociation and heat exchange in the dissociation and heat exchange region 50.

The dissociation and heat exchange region 50 may be constituted not just by a single dissociation "pool," as shown schematically in FIG. 2, but rather may consist of a number of linked, heat-exchanging devices in a number of different water treatment ponds or pools. The actual depth, size, throughput, etc. will depend on the production rate, which will depend, in turn, on the temperature of the input water, the particular gas or gas mixture used to form the hydrate, the rate at which heat can be removed from the system, etc.

The input of water into the base of the fractionation column can be controlled by a device (not shown) that alters the input throat diameter so as to facilitate mixing of the gas and water, thereby promoting more rapid and complete hydrate formation. Alternatively or additionally, hydrate formation can be enhanced by creating flow turbulence in the input water, just below or within the base of the hydrate forming gas injection port 36. It may further be desirable to vary the diameter of the desalination fraction column in a manner to slow the buoyant descent of the hydrate slurry, thereby enhancing hydrate formation.

The dissociation and heat exchange region 50 will be significantly wider and larger than the lower portions of the desalination column. This is because hydrate will be floating up into it and dissociating into gas and fresh water at a rate that is faster than that which could be accommodated in a pool that is the diameter of the column itself. Moreover, the requirement for heat will be great; if sufficient heat cannot be provided, water ice will form and disrupt the desalination process. Provision for physical constriction within a column will hold hydrate below the level where it dissociates freely, thus providing for a control on the amount of gas arriving at the surface. This is done for both normal operational and safety reasons.

Because the positively buoyant hydrate used in this embodiment of the invention floats, fresh water tends to be produced at the top of the section, thereby minimizing mixing of fresh and saline water. To inhibit unwanted dissociation, the heat exchanger apparatus may extend downward to the top of the residual water removal section. The dissociation and heat exchange pools do not need to be centered over the water column; moreover, more than one desalination fractionation column may feed upward into a given dissociation and heat exchange pool. Similarly, groups of desalination fraction columns can be located close together so as to be supported by common primary and secondary water treatment facilities, thereby decreasing installation costs and increasing economy.

In addition to large-scale installations, relatively small-scale installations are also possible. For these installations, smaller diameter desalination columns can be constructed in locations where lower volumes of fresh water are required. Although overall efficiency of such systems will be lower than larger scale systems, the primary advantage of such small-scale installations is that they can be implemented using standard drilling methods. Furthermore, mass-produced, prefabricated desalination apparatus sections can be installed in the casings of drilled holes; this allows the installation to be completed in a relatively short period of time. Capital cost of such an installation also is reduced, as fabrication of the components can be carried out on an industrialized basis using mass production techniques. The various operating sections of a smaller-scale installation might be replaced by extracting them from their casing using conventional drilling and pipeline maintenance techniques.

Figure 5:
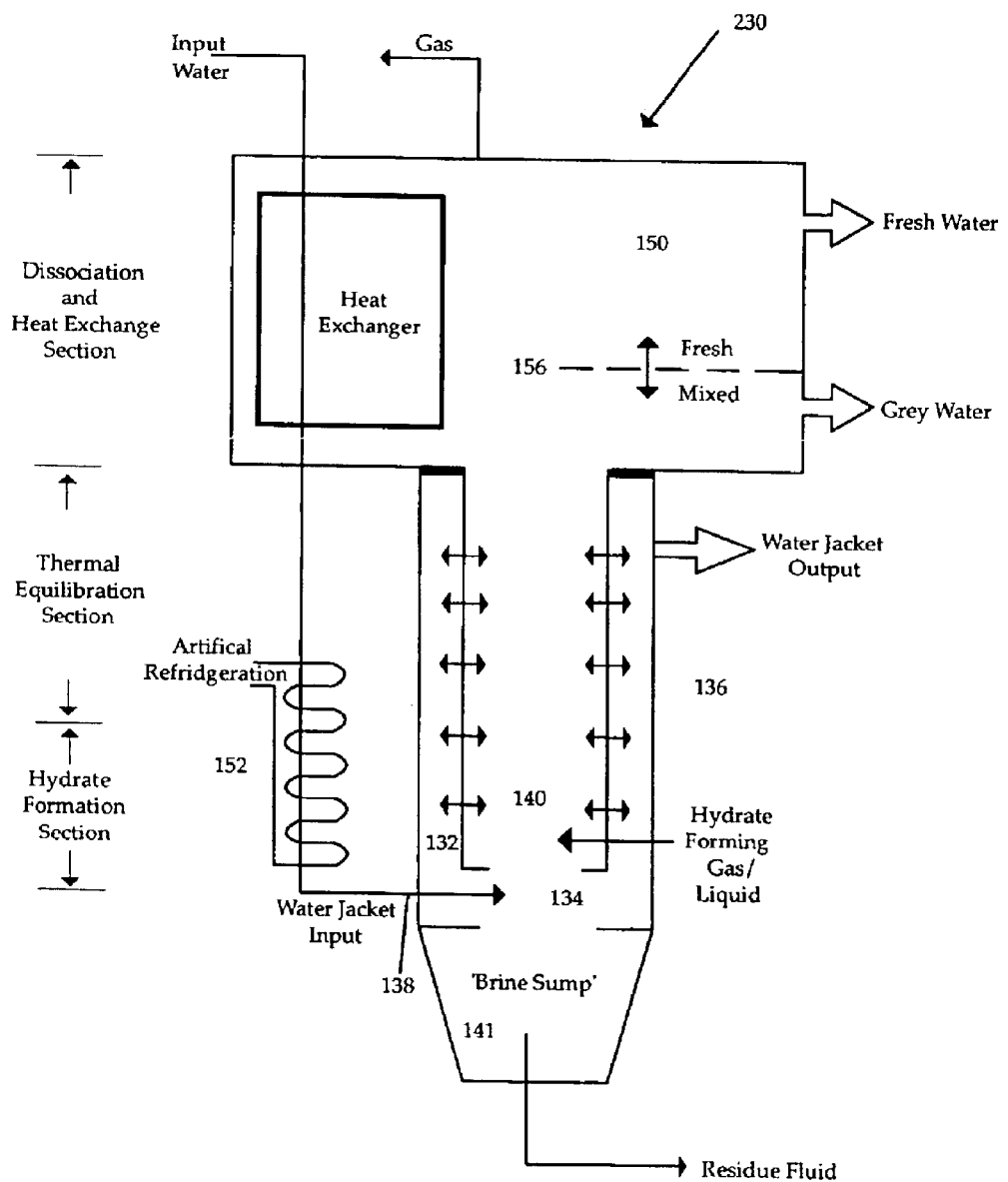
FIG. 5 is a diagrammatic, side elevation view of another embodiment of a desalination fractionation column which utilizes positively buoyant hydrate and which may be employed in the installation shown in FIG. 1.

An alternate, slightly simplified embodiment 230 of a desalination fractionation column according to the invention is shown in FIG. 5. In this embodiment, hydrate formation occurs essentially within a thermal equilibration column 132. The thermal equilibration column 132 has an open lower end 134 and is suspended in shaft 136. In this embodiment, input water is injected near the base of the desalination column 132, e.g. as at 138, preferably after passing through heat exchange and dissociation region 150 of the column 230 in similar fashion to the embodiment shown in FIG. 2. Positively buoyant hydrate-forming gas is injected into the lower portions of the thermal equilibration column 132, as at 140, and hydrate will form and rise within the column 132 much as in the previous embodiment. The embodiment 230 is simplified in that heat of formation of the hydrate is transferred to water surrounding the thermal equilibration column 132 within a "water jacket" defined between the walls of the column 132 and the shaft 136 in which the desalination fractionation column is constructed. To this end, the hydrate formation conduit preferably is made from fabricated (i.e., "sewn") artificial fiber material, which is ideal because of its light weight and its potential for being used in an open weave that greatly facilitates thermal equilibration between residual saline water within the thermal equilibration column 132 and seawater circulating within the water jacket.

As is the case with the embodiment shown in FIG. 2, warmed water is pumped out of the system, this warmed water being water which has circulated within the water jacket. In contrast to the embodiment shown in FIG. 2, however, the intent of removing warmed water from the water jacket is not to remove so much heat energy that the input water is automatically cooled to temperatures suitable for formation of the hydrate at the base of the column, but rather it is simply to remove enough heat energy to prevent water within the interior of the hydrate formation conduit from becoming so warm that hydrate cannot form at all. Accordingly, the rate at which warm water is removed from the water jacket may be relatively small compared to the rate at which warm water is removed from the heat extraction portion 44 of the embodiment shown in FIG. 2. As a result, it is necessary to supplement the cooling which takes place in the heat exchange and dissociation region 150 using supplemental "artificial" refrigeration means 152. Operation is otherwise similar to that of the embodiment shown in FIG. 2: fresh water is extracted from the upper portions of the heat exchange and dissociation portion 150; "gray water" is extracted from lower portions of the heat exchange and dissociation region 150, i.e., from below the line of separation 156; and concentrated brine is removed from brine sump 141.

Figure 6:
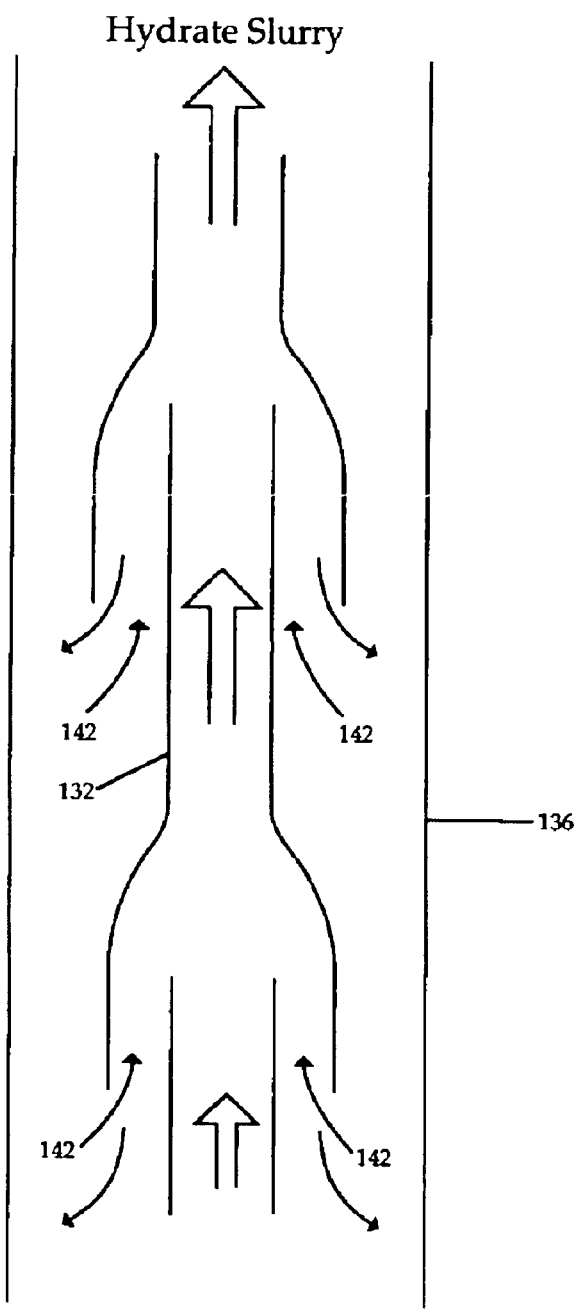
FIG. 6 is a diagrammatic, side elevation view showing overlapping water vents used in the desalination fractionation column shown in FIG. 5.

To facilitate "settling out" of brine which is sufficiently dense to be negatively buoyant due to concentration and/or cooling, and to facilitate heat transfer and thermal equilibration, the equilibration column 132 preferably is constructed with overlapping joints, as shown in FIG. 6. This configuration permits the buoyant hydrate to rise throughout the column, while cooled, more saline water can flow out through the vents 142, as indicated schematically.

Figure 7:
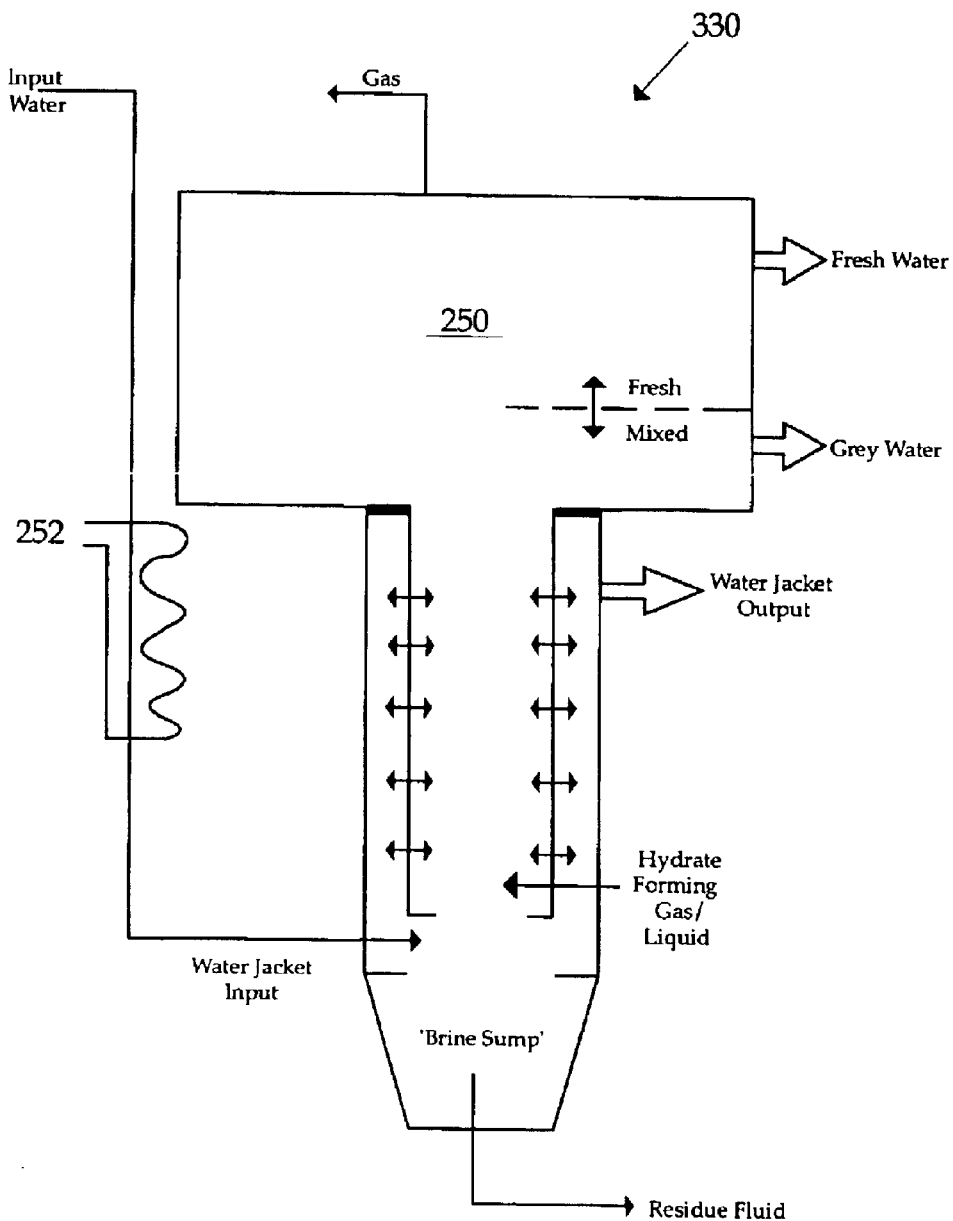
FIG. 7 is a diagrammatic, side elevation view of yet another embodiment of a buoyant hydrate-based desalination fractionation column employed in the installation shown in FIG. 1, which embodiment is similar to that shown in FIG. 5.

The desalination fractionation column installation may be further simplified by feeding the input water into the system without passing it through the dissociation section 250 of the embodiment 330 shown in FIG. 7. If the input water is not sufficiently cold, more artificial refrigeration will need to be provided by refrigeration means 252, but operation is otherwise the same as embodiment 230 shown in FIG. 5.

Figure 8:
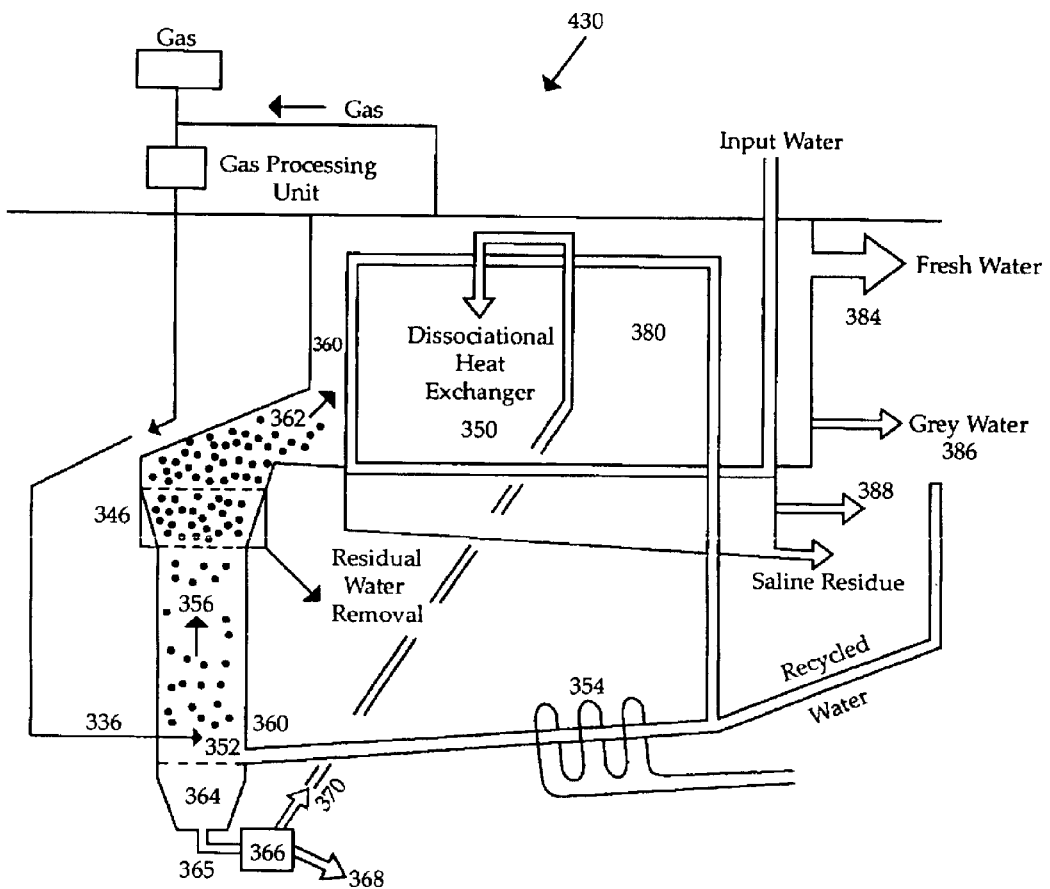
FIG. 8 is a diagrammatic, side elevation view of an embodiment of a desalination fractionation column which permits the utilization of negatively buoyant hydrate and which may be employed in the installation shown in FIG. 1.
Figure 9:
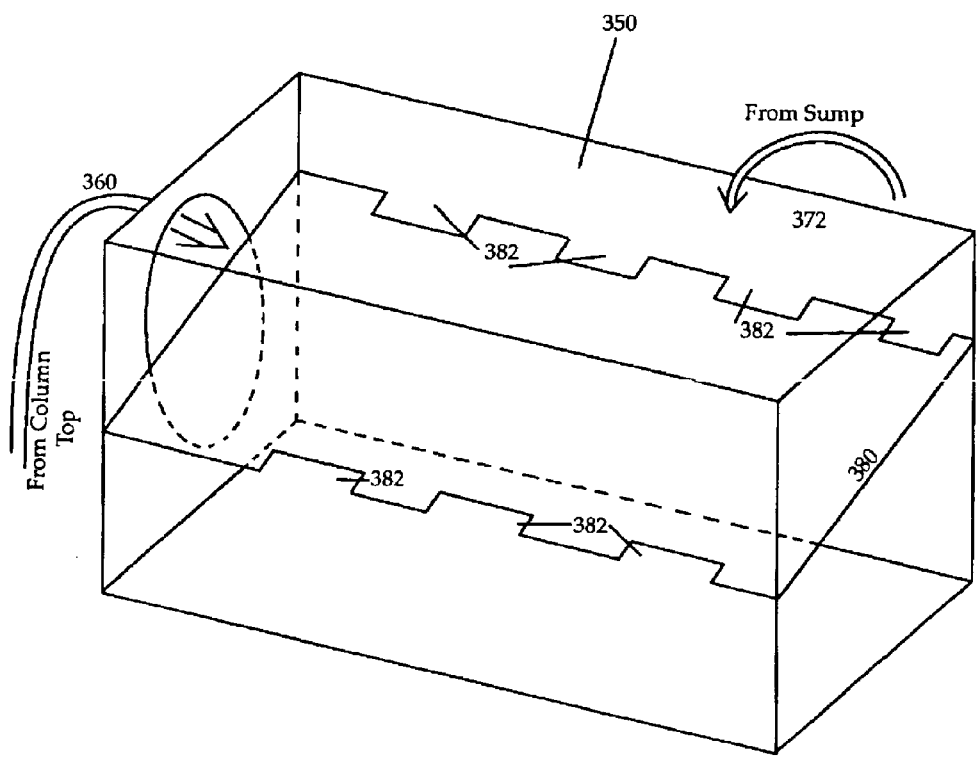
FIGS. 9 and 10 are schematic, isometric and end views, respectively, of the dissociation and heat exchange portion of the desalination fractionation column shown in FIG. 8.
Figure 10:
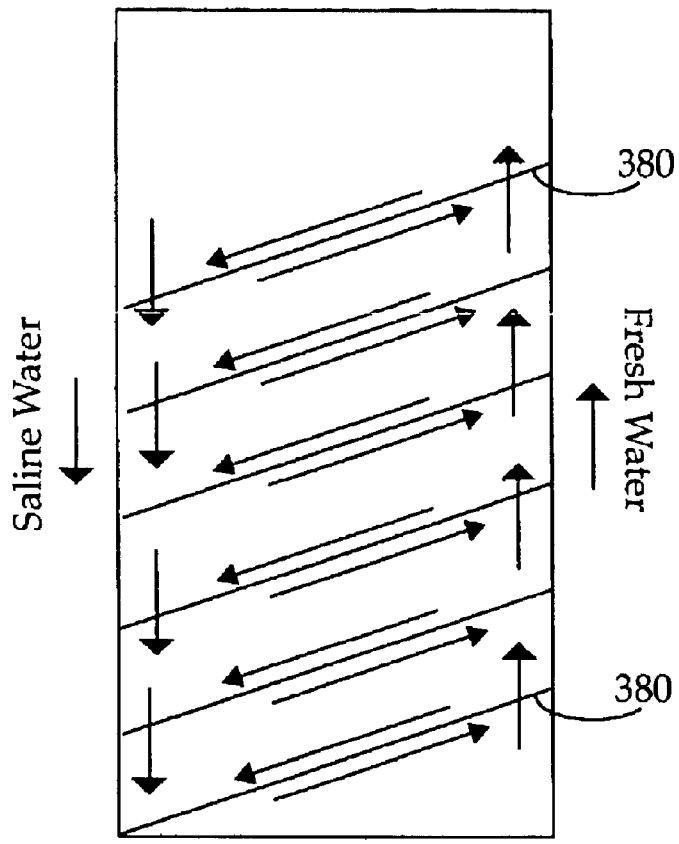

Whereas the embodiments described so far utilize gas or mixtures of gas which form positively buoyant hydrates under appropriate temperature and pressure conditions, the versatility of hydrate-based desalination or purification can be expanded greatly by adapting the methods and apparatus described above to accommodate negatively buoyant hydrates., An embodiment 430 of a desalination fractionation "column" configured to permit the use of negatively buoyant hydrate for water purification is shown in FIGS. 8–10. The major difference between this embodiment 430 and the preceding embodiments of desalination fractionation columns is that the heat exchange and dissociation portion 350 of the installation is laterally or horizontally displaced or offset relative to the hydrate formation and heat removal sections 336 and 346, respectively. The hydrate formation and heat removal sections are similar to those in the embodiments described above.

A number of different operating gases can be employed with this configuration. Low molecular weight gases such as $O_2$, $N_2$, $H_2S$, Ar, Kr, Xe, $CH_4$, and $CO_2$ all form hydrates under different pressure-temperature conditions. Each of the different hydrate-forming gas systems will require special design of the hydrate column which is tailored to the particular gas used in the installation, but the principles of hydrate formation to extract fresh water will remain the same. Additionally, adding small amounts of additive gas (es) to the primary hydrate-forming gas may broaden the hydrate stability field in the same way the methane hydrate stability field is expanded by mixing higher density hydrocarbon gases with methane.

Although a number of different gases that form negatively buoyant hydrate may be used for hydrate desalination, carbon dioxide and the desalination column in which it is used are described herein to illustrate the design requirements and considerations for a desalination system employing hydrate that is naturally less buoyant than seawater. Carbon dioxide (or carbon dioxide-based gas mixtures, referred to herein simply as "carbon dioxide" for simplicity) is an ideal gas to use for a number of reasons: carbon dioxide does not combust under the physical and thermal conditions encountered in the hydrate desalination apparatus, and is thus virtually hazard-free; carbon dioxide hydrate is stable at shallower depths than methane hydrate (and about the same as mixed gas methane hydrate); even if present dissolved in relatively high concentrations, carbon dioxide is safe for human consumption—in fact, fresh water produced using carbon dioxide can be made so as to retain some quantity of the carbon dioxide, thereby providing soda water that is similar to many popular brands but that is different in at least one significant way: it will contain all the naturally occurring minerals found in seawater in proportion to the remaining salts not removed during the desalination process—and is not offensive to either taste or smell (as would be the case of $H_2S$ hydrate); carbon dioxide hydrate is, like methane, tasteless and odorless; there is considerable recent experimental information which demonstrate clearly the actual marine behavior of the formation and behavior of carbon dioxide hydrate; and carbon dioxide is very common and can be produced locally almost anywhere and is also commonly available as an industrial waste product. (A further advantage of using carbon dioxide as compared to methane or methane mixes is that the higher heat of fusion of carbon dioxide hydrate will heat the residual water more quickly than methane or methane-mixed gases; thus, the induced thermal bias will be higher and the system will operate more efficiently.)

Figure 11:
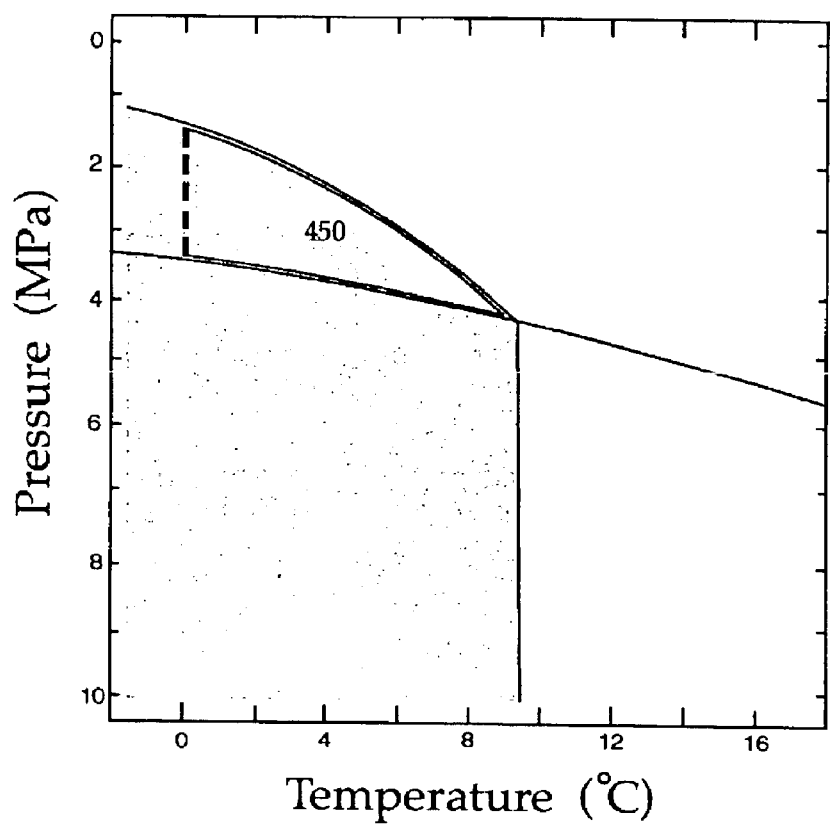
FIG. 11 is a Pressure/Temperature diagram depicting regions of $CO_2$ hydrate stability, the $CO_2$ liquidus, and the operating envelope for a negatively buoyant, $CO_2$ hydrate-based desalination system.

Design and engineering of the desalination fractionation column will be determined in large measure based on the phase properties of the particular gas being used. FIG. 11 shows, for example, the carbon dioxide hydrate stability regions superimposed over the carbon dioxide phase diagram. The shaded portion of the diagram indicates that carbon dioxide hydrate (formed from carbon dioxide gas) is stable at from an upper pressure limit of about 18 atmospheres, just above 0° C., to about 40 atmospheres pressure at just above about 8° C. With respect to carbon dioxide, per se, the liquidus extends from about 37 atmospheres pressure at just above 0° C., to about 40 atmospheres pressure at just above 8° C. Above the liquidus, carbon dioxide exists as a gas; below the liquidus, carbon dioxide spontaneously compresses to a liquid.

Accordingly, the system is constructed so that, assuming carbon dioxide is used as the operating gas, the carbon dioxide is injected into the hydrate formation portion of the column at ambient temperature and pressure that is within the operating region 450 that consists of the portion of the carbon dioxide hydrate stability zone that lies above the carbon dioxide liquidus and above the freezing point of water. The practical result of this is that the range of water depths at which carbon dioxide may be used as the operating gas is relatively small and is comparatively shallow. Accordingly, a relatively shallow land apparatus can be constructed, which will reduce construction complexity and cost.

Similar to the embodiments described above, carbon dioxide (or other negatively buoyant hydrate-forming gas, as desired) is injected near the base of the hydrate formation section 336 (e.g., at 352) and mixed with supply or input seawater that has been chilled by being passed through the heat exchange and dissociation portion 350 and/or by "artificial" refrigeration, as at 354. The carbon dioxide hydrate will float only if the formation of the hydrate is incomplete such that a complex, hydrate-gas meshwork is formed. This condition is met when the gas is injected rapidly and in relatively large bubbles. The carbon dioxide hydrate isolates carbon dioxide gas bubbles from the surrounding seawater, thereby preventing further formation of hydrate. The combined gas/liquid carbon dioxide and hydrate is positively buoyant, even though the hydrate per se is negatively buoyant (i.e., has a greater specific gravity than the seawater), and floats upward, as at 356. Additionally, some of the bubbles will burst and new hydrate shells will be formed; hydrate shells with gas bubbles predominantly form new carbon dioxide hydrate rims, which are assisted upward by carbon dioxide gas which tends to adhere to solid hydrate particles.

The system is designed to produce as much hydrate as possible, consistent with leaving enough warm, lower-density, residual fluid to form a "flux" and to allow extraction of heat by removing the residual seawater in the heat extraction section 346. The system furthermore has the capacity for very rapid liquid or gas injection, which may be in time-sequence bursts rather than being continuous. It is intended that not all gas form hydrate, as noted above, to ensure incomplete formation of hydrate. Thus, larger quantities of gas are required for a negatively buoyant hydrate-based system than for a complete hydrate-forming gas system such as the positively buoyant hydrate-based systems described above.

As in the case of positively buoyant hydrate-based embodiments, formation of the negatively buoyant (assisted buoyancy) hydrate is exothermic. Accordingly, heat which is given off during-hydrate formation warms the surrounding, residual seawater, which makes the residual seawater more buoyant than the chilled seawater which is being input into the lower part of the column. The residual seawater therefore moves buoyantly upward along with the hydrate as new, denser input water is supplied to the base of the fractionation column, as at 360.

The upward movement of the surrounding residual seawater, along with the original upward movement of the assisted buoyancy hydrate, has a certain momentum associated with it. This carries the hydrate upward through the column until it reaches a lateral deflection zone 362, where the hydrate/residual seawater slurry is diverted horizontally or laterally relative to the hydrate formation and heat removal sections 336 and 346 and into the dissociation and heat removal section 350. Thus, even though some of the hydrate "bubbles" will burst or crack, thereby releasing the carbon dioxide gas contained therein and losing buoyancy, the hydrate in large measure continue to move upward and over into the heat exchange and dissociation region of the column 350 due to this momentum. As the hydrate loses momentum within the heat exchange and dissociation portion 350, it will settle and dissociate into the gas and fresh water, which will separate from residual seawater as described in greater detail below.

Some of the hydrate, however, will form solid masses without entrapped gas and will sink to the lowermost, sump portion 364 of the column. Concentrated brine will also sink to and settle in the sump portion 364. The sunken hydrate and concentrated residual brine are pumped out of the sump at 365 and separated by appropriately configured separation means 366. The waste saline water 368 is disposed of as appropriate, and a slurry consisting of the sunken hydrate is pumped upwardly as indicated at 370 and is discharged into the heat exchange and dissociation chamber 350, e.g. at 372, where the hydrate dissociates into gas and fresh water.

Within the dissociation and heat exchange chamber 350, the hydrate, whether delivered or transported to the chamber via the lateral deflection portion 362 of the column or pumped from the sump of the desalination fractionation column 364, will dissociate into fresh water and the hydrate-forming gas.

To facilitate separation of fresh water from saline water, it is necessary to promote transfer of as much hydrate to the upper part of the dissociation and heat exchange chamber 350 as possible; to hold hydrate as high in the dissociation and heat exchange chamber 350 as possible until dissociation of that volume of hydrate is complete; and to keep mixing of the fresh water produced by dissociation and the more saline residual water to a minimum. The configuration of the dissociation and heat exchange chamber shown in FIGS. 9 and 10 facilitates these objectives.

In particular, the assisted buoyancy hydrate slurry rising through the desalination fractionation column enters the chamber as at 360 after being diverted laterally at deflection portion 362, as indicated schematically in FIG. 9. Additionally, hydrate slurry being pumped from the sump is injected into the dissociation chamber at 372, where it may be placed within special fluid separation devices. The dissociation and heat exchange chamber is constructed with a number of canted separator shelves 380 which extend from one end of the chamber to the other, as well as from one side of the chamber to the other. The canted nature of the shelves allows the denser saline water to sink and the lighter fresh water to rise within and between the shelves, thereby minimizing turbidity and mixing of saline and fresh water. The separator shelves 380 are canted in that they slope downward, both from one end of the chamber to the other as well as from one side of the chamber to the other. The separator shelves have pass-through apertures 382 which allow the denser, saline water to sink within the system and the less dense, fresh water to rise within the system to the top of the chamber as the hydrate dissociates into the fresh water and gas.

Fresh water, which is cooled due to the cooling bias created by the removal of warm residual water as described above in connection with the positively buoyant hydrate embodiments, is removed as at 384 and may be used for cooling as well as for potable water. "Gray" water and saline residue are removed from lower portions of the heat exchange and dissociation chamber 350, as at 386 and 388, and are handled as described above in the context of the positively buoyant hydrate embodiments, e.g., gray water may be used for drinking or industrial applications and the saline residue may be recycled back as input into the base of the desalination fractionation column.

As an alternative to gaseous carbon dioxide, liquid carbon dioxide can be used to form assisted buoyancy hydrate. At the relatively shallow depths appropriate to the formation of hydrate for separation of fresh water, liquid carbon dioxide is more buoyant than seawater (although not as buoyant as gaseous carbon dioxide.) By injecting liquid carbon dioxide energetically into seawater, a resultant meshwork of hydrate and liquid carbon dioxide is formed which is positively buoyant. The meshwork mass will rise spontaneously as a whole immediately upon forming and will behave essentially the same as a hydrate meshwork formed from gaseous carbon dioxide and carbon dioxide hydrate.

(Advantages of liquid carbon dioxide over gaseous carbon dioxide stem from the fact that once the carbon dioxide is compressed, it can be transported to deeper depths without further compression. Thus, injecting liquid carbon dioxide at depths of five hundred meters or more—well below the liquidus—is possible without the need for deep, in-line pumps. Moreover, deeper (i.e., higher pressure) injection of liquid carbon dioxide will promote very rapid crystallization and growth of the hydrate crystals.)

When liquid carbon dioxide is used to form assisted buoyancy hydrate, dissociation is comparatively violent because the unhydrated liquid carbon dioxide trapped within the meshwork produces large volumes of carbon dioxide gas when the mixture rises above the liquidus. Thus, in addition to the carbon dioxide gas released by dissociation of the hydrate (which occurs above the carbon dioxide liquidus), the extra gas produced by conversion of the liquid carbon dioxide to gaseous carbon dioxide has the potential to cause significant turbulence and mixing. Therefore, flow of the hydrate should be controlled such that it enters the dissociation section while still within the hydrate stability field in order to preclude significant dissociation while residual interstitial saline water remains in the slurry.

Additionally, where carbon dioxide liquid is used to form assisted buoyancy hydrate, care should be taken to allow residual fluid to alter its state to gas once the hydrate has risen above the liquidus pressure depth, but while the hydrate remains stable. This will reduce turbulence and mixing when the hydrate finally dissociates.

Figure 12:
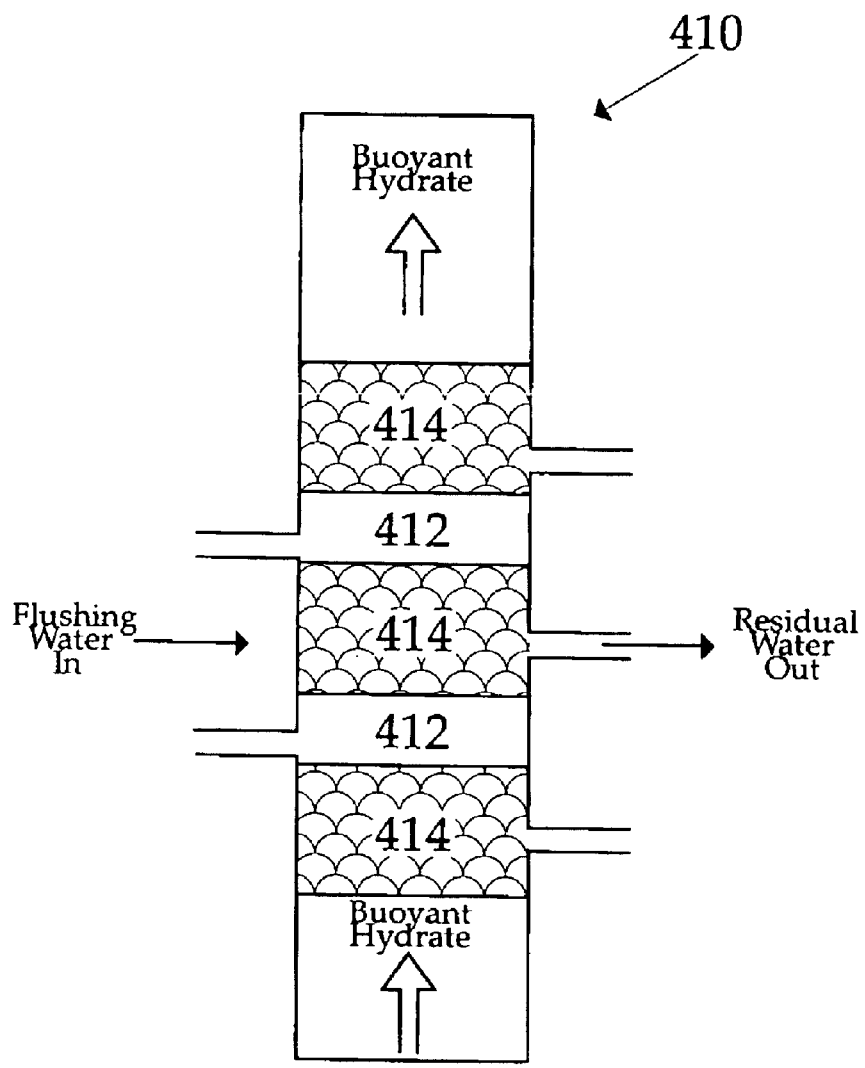
FIG. 12. is a diagrammatic, side elevation view of a residual fluid replacement section designed to facilitate washing of the hydrate slurry.

Ideally, residual saline water should be replaced by fresh water before the hydrate rises into the gas-stable zone and then the dissociation area of the carbon dioxide hydrate phase diagram (FIG. 11). This can be accomplished using multiple water injection points alternatingly arranged between multiple residual or interstitial water removal sections, as illustrated in FIG. 12. In other words, the fluid removal section 44 (FIG. 2) is constructed as an alternating sequence of fresh water injection subsections 412 and fluid removal subsections 414 constructed as shown in either FIG. 3 or FIG. 4. The benefits of removing the interstitial saline fluid include additional heat removal; washing of the slurry (i.e., removal of pollutants or adhering ions or particulate material from the surface of the hydrate crystals) by fluid replacement; and direct removal of saline interstitial water from the hydrate slurry and dilution or replacement of the original saline interstitial fluid produced by the process of hydrate formation.

Although washing of interstitial water is strongly recommended for the slurry mixture of liquid carbon dioxide and carbon dioxide hydrate so as to minimize turbulence and mixing attributable to the liquid carbon dioxide converting to gaseous carbon dioxide, washing the slurry and flushing saline interstitial fluid therefrom would also provide benefits for any positively buoyant hydrate-based or assisted buoyancy hydrate-based system. In particular, injecting cold water (either fresh or gray) from the dissociation section into the hydrate slurry will remove additional heat from the hydrate at the same time that saline interstitial water is flushed from the hydrate slurry. Moreover, multiple residual water flushings will ensure greater fresh water production.

Figure 13:
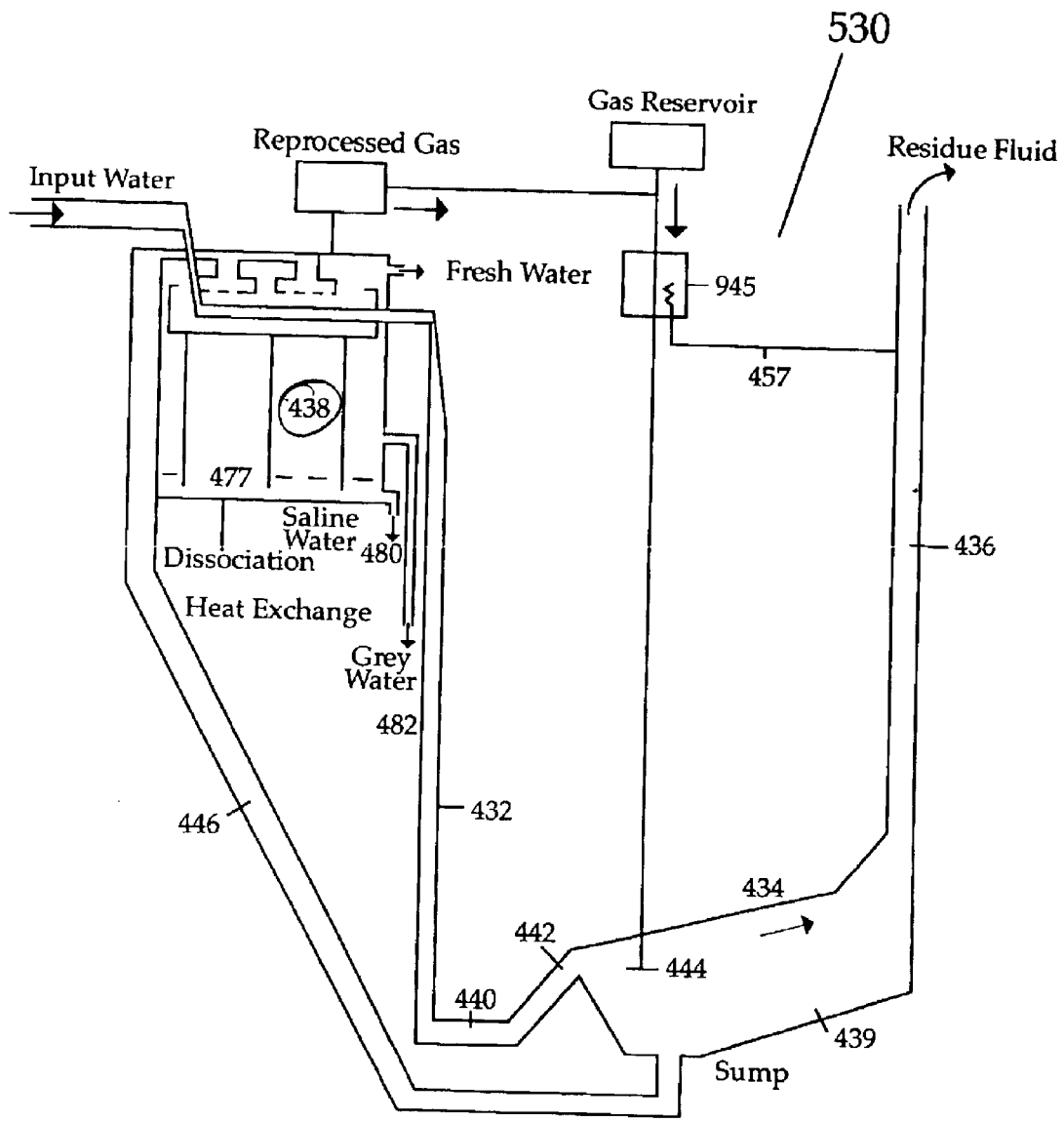
FIG. 13 is a diagrammatic, side elevation view of another embodiment of a desalination fractionation column which permits the utilization of a negatively buoyant hydrate, which embodiment facilitates separation of residual seawater from the negatively buoyant hydrate.
Figure 14:
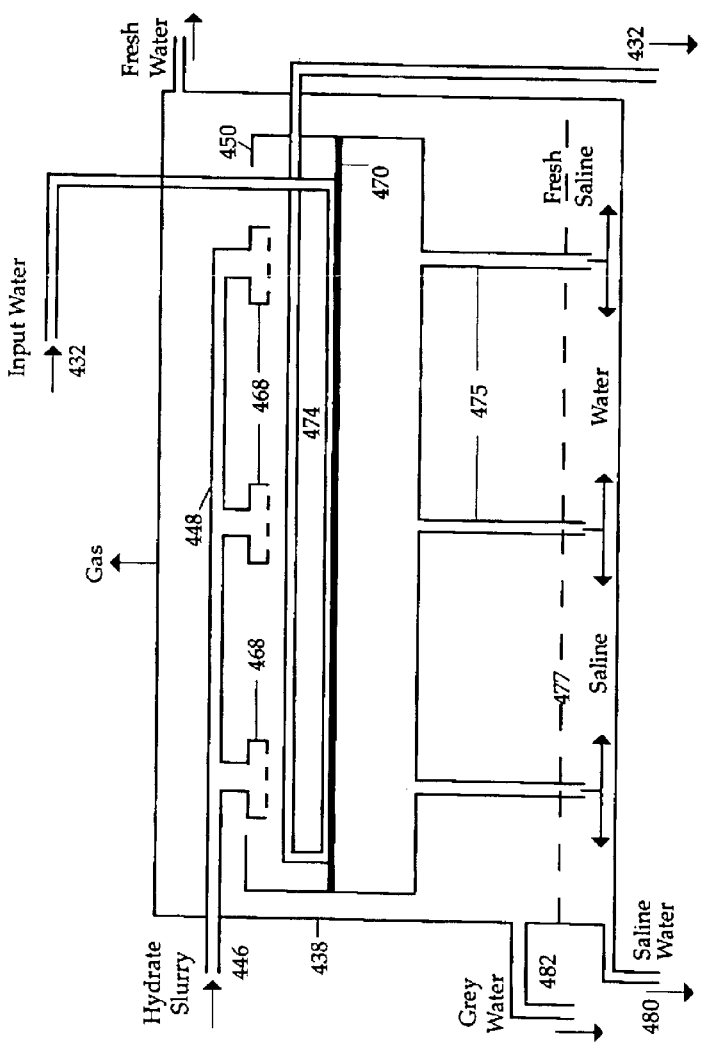
FIG. 14 is a diagrammatic, side elevation view of a slurry holding, fluid separation apparatus used in the installation of FIG. 13.

Another embodiment 530 of a desalination fractionation "column" which is configured to utilize negatively buoyant hydrate and which facilitates separation of the hydrate and residual seawater is illustrated in FIGS. 13 and 14. The "column" is configured as an asymmetric, U-shaped installation, which consists primarily of a seawater input conduit 432, a hydrate formation and catch sump region 434, and a residue fluid riser conduit 436. As in previous embodiments, the seawater input conduit passes through a dissociation and heat exchange region 438 which, in this embodiment, is configured especially as a hydrate "catch basin." As in the previous embodiments, the input water is passed through the dissociation/heat exchange catch basin 438 in heat exchanging relationship with dissociating hydrate in order to chill the input seawater.

The input seawater is pumped to the base 440 of the column, where it turns and flows upward and laterally through elbow portion 442 before entering the hydrate formation and catch sump 434. Negatively buoyant hydrate-forming liquid or gas is injected into the input seawater in the hydrate formation and catch sump at 444. (Means 945 for liquifying certain gases are provided; residual fluid can be used in a heat exchanger 457 to provide cooling for the liquification process.) Injection of the gas or liquid is controlled such that hydrate formation is complete (in contrast to incomplete, as in the case of the previously described, assisted buoyancy embodiment), i.e., such that all gas is utilized to form hydrate. The negatively buoyant hydrate settles to the bottom of the catch sump 434. As the hydrate settles, it displaces the residual seawater, which is warmed by the heat liberated during hydrate formation. The residual seawater therefore rises buoyantly through residue fluid riser conduit 436, and it is pumped out of the system to remove heat and create a cooling bias in the system as in the previously described embodiments.

The rate of formation and settling of the hydrate is controlled such that it "packs" down to the point of being grain supported. Mechanical apparatus such as a vibration tray is located on the sloping floor 439 of the settling portion of the hydrate-residual fluid chamber 434. This concentrates the hydrate and minimizes residual fluid remaining so that the hydrate can be pumped rapidly, as a slurry, from the base of the sump up into the dissociation/heat exchange catch basin 438 via slurry pumping conduit 446. The hydrate slurry is pumped to the dissociation/heat exchange catch basin 438 at a rate that is generally faster than the rate at which positively buoyant hydrates rises in the previously described embodiments. Decreasing the time required to transfer the hydrate from the formation region (where it is at its maximum stability) to the dissociation region (where it is at its minimum stability) ensures that a greater proportion of the hydrate will dissociate relatively high in the catch basin. This reduces the amount of mixing of fresh and residue water and increases the relative proportion of fresh water that can be recovered.

Pumped hydrate slurry arrives in the dissociation/heat exchange basin in a concentrated form with little more than intergranular saline water present. Care is taken to allow the saline water to separate downward and fresh water upward so that there is a minimum of mixing. This is achieved by placing a slurry holder and fluid separator tank in the upper part of the dissociation/heat exchange chamber 438. This allows the negative buoyancy hydrate dissociation to take place so that saline water is delivered to and collects in the lower part of the dissociation chamber 438, in which the slurry holder and fluid separator tank is placed, without mixing with fresh water.

A preferred slurry holder and fluid separator consists of a fixed, wide-mouthed, upwardly open tank or tanks 450 (FIG. 14) that receive the hydrate slurry from above. Each tank holds the negatively buoyant hydrate from the hydrate slurry transfer system 446 and prevents it from sinking to toward the base of the dissociation chamber 438. The hydrate slurry is delivered by pipes 448 to a number of hydrate spreaders consisting of vanes or rotating vanes designed to disperse the granular hydrate 468. The negatively buoyant hydrate separates while falling to a screen shelf 470 in the tank. This allows saline water to sink through the screen shelf at the base of the circulating input water intercooler system 474, which transfers heat from the input water to the dissociating hydrate and feeds the cooled water downward to be treated.

A number of residual water delivery pipes 475 extend downward from the base of this slurry holding tank, which allows heavier saline water to flow to the base of the vessel without disturbing the water surrounding these pipes. Thus, even when the fresh water-saline water interface is located in the vessel below the slurry holding tank, no mixing occurs between the residue water purged from each input of hydrate slurry because of a physical separation. The main interface 477 (dashed line) between fresh and saline water will be located somewhere the lower part of the dissociation/heat exchange chamber 438, where saline water naturally collects below fresh due to density differences. Saline water is removed at the base of the chamber 480, and provision is also made for gray water removal as at 482.

Multiple slurry holding tanks may be placed within a given dissociation/heat exchange chamber so that the flow of hydrate slurry can be rapid enough to prevent clogging or freezing up of any one tank. Circulating input water may be passed first through one slurry holding tank and then through another to minimize temperature of the input water as it exits the dissociation/heat exchange chamber.

All fluids will find their relative positions according to natural buoyancy or through a process of fractionation. All internal piping in the vessel can be fabricated from inexpensive plastic or other material. This method of fluid separation may also be installed in the dissociation/heat exchange section of the assisted buoyancy and pumped sump embodiment shown in FIG. 8.

Preferably, the slurry pumping conduit 446 is constructed as a variable volume pipe, in order to permit periodic pumping of hydrate without allowing the hydrate to settle or move upward slowly. Such a variable volume pipe can be fabricated relatively easily by inserting a flexible sleeve within the slurry pumping conduit 446 around which fluid can flood when the pressure within the liner is reduced.

The injection point 444 of the hydrate-forming liquid or gas, it will be noted, is positioned above the base of the column 440 so that in the event of incomplete hydrate formation (which would result in the formation of assisted buoyancy hydrate), any excess gas which does not form hydrate (along with assisted buoyancy hydrate) will rise up the residue fluid riser conduit 436. (Very little hydrate will escape with gas up the residue fluid riser conduit 436, and any such hydrate will have dissociated prior to arriving at the top of the residue riser section. Therefore, the amount of fresh water "lost" by being transported by such hydrate will be minimal; recovery of that fresh water is not feasible; and accordingly no connection is provided between the output of the residue fluid riser conduit 436 and the dissociation/heat exchange catch basin 438.)

For proper operation of this embodiment, flow rate controls such as constrictors should be used to keep the rate of flow of fluid through the system low enough to keep solid hydrate from being swept up the residue fluid riser conduit 436. Furthermore, the design of the hydrate formation and catch sump 434, as well as the lower portion of the residue fluid riser conduit, should be designed to facilitate "clean" separation of the hydrate from the residue fluid. Accordingly, the hydrate formation and catch sump 434 is designed to impart lateral movement to the residue fluid as well as to permit upward movement thereof. This causes the hydrate/residue fluid mixture to move initially with a relatively small upward component, which facilitates settling out of the hydrate and which is in contrast to the previously described embodiments, which provide more vertically oriented fluid movement that is comparatively turbid and which have poorer settling and separation characteristics.

In the embodiments described thus far, the weight of the column of water creates the pressures required for hydrate formation. In these embodiments, the minimum pressure depth at which hydrate is stable is far greater than at sea level, where the pressure is one atmosphere. Accordingly, the hydrate begins to dissociate at relatively elevated pressures.

Various ones of the embodiments described above may be modified so as to collect the fresh water released from the hydrate and to capture the released gas at the region of the fractionation column where the dissociation takes place, rather than at the top of the column (surface level; one atmosphere ambient pressure), with certain resultant advantages. In particular, relatively large volumes of hydrate-forming gases and gas mixtures are required to desalinate large volumes of water. Therefore, if the gas is captured, processed for re-injection, and stored while maintained at elevated pressures (e.g., the pressure at which the hydrate begins to dissociate), the volume of gas that must be handled will be much smaller than would be the case if the gas were allowed to expand fully as it rises to the surface and pressure drops to atmospheric. Additionally, if the hydrate-forming gas is kept pressurized, raising its pressure to the pressure required for injection in the hydrate-forming section requires far less recompression of the gas and hence is less costly.

Figure 15:
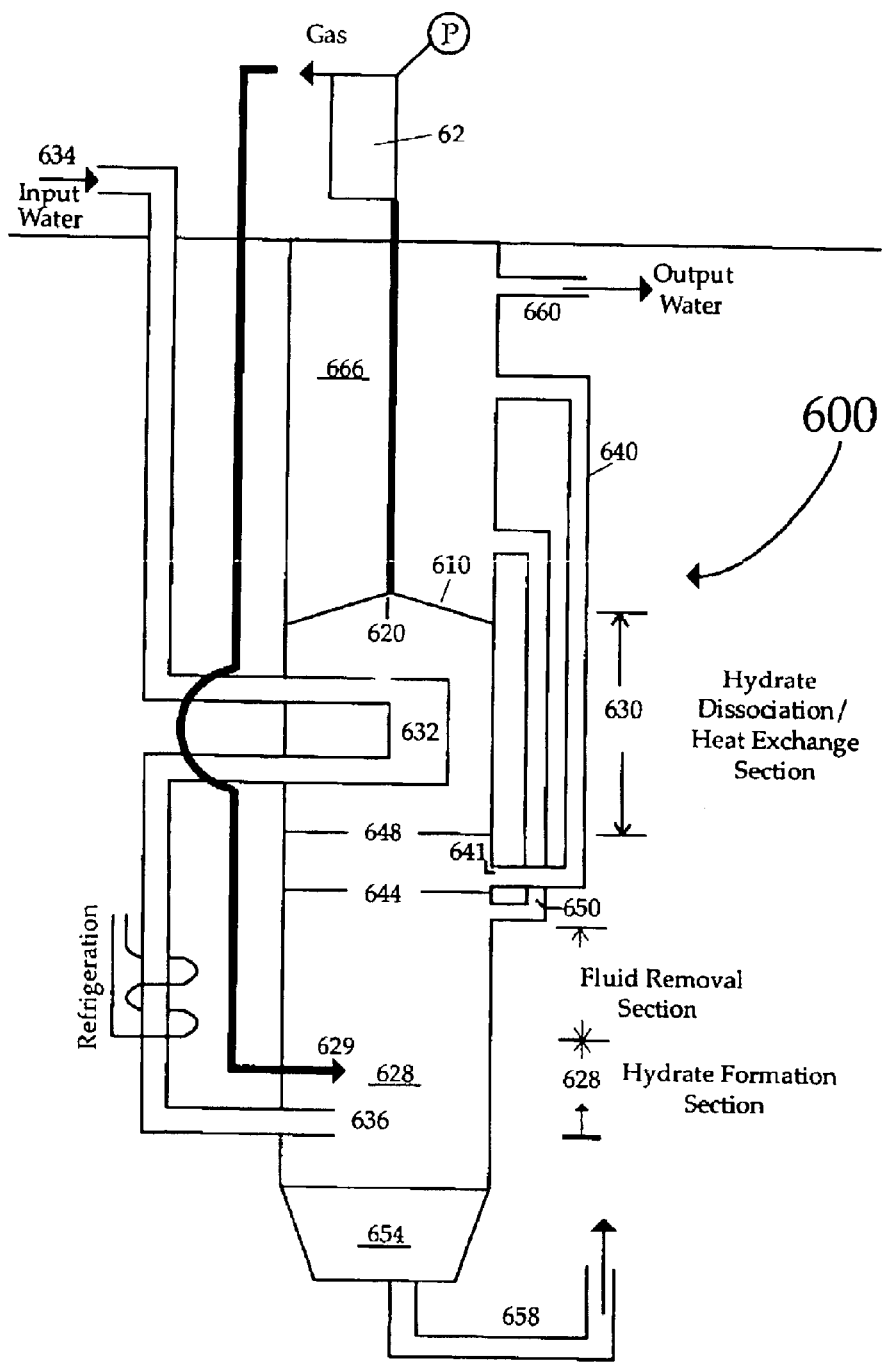
FIG. 15 is a diagrammatic, side elevation view of an embodiment of a desalination fractionation column configured to maintain the hydrate-forming gas at elevated pressure.

A preferred embodiment 600 in which dissociation and gas capture and processing are controlled so as to be kept at elevated pressure is illustrated in FIG. 15. In this embodiment, a physical barrier 610 extends across the fractionation column and blocks the upward movement of the hydrate slurry. The location of the barrier 610 depends on the stability limits of the particular hydrate-forming substance used, but will be above the region of hydrate stability (i.e., at lesser pressure-depth). As the hydrate dissociates, the released gas forms a pocket at trap 620 and enters a gas recovery and processing system 626 while still at a pressure depth considerably greater than one atmosphere surface pressure. (The gas processing system 626 may contain means for liquifying certain gases.) The gas is processed and re-injected into the hydrate formation section 628 at 629 in the same manner as in the previously described embodiments, except the gas system is maintained at considerably higher pressure.

The hydrate dissociation section 630 extends downward to some particular depth determined by the particular hydrate-forming gas being used. Because the hydrate dissociates under "controlled," elevated pressure, the dissociation reaction will proceed generally more slowly than in the above-described embodiments. Therefore, the heat exchanger 632 present in the dissociation/heat exchanger section (as described in connection with previous embodiments) is designed to accommodate the particular, slower reaction rates. Input water 634 is passed through the dissociation/heat exchange section in heat exchanger 632 and is injected into the base of the desalination fractionation column at 636, as in previously described embodiments.

One or more fresh water bypass pipes 640 communicate with the dissociation region at a point 641 located above the fresh water/saline water interface 644 but below the upper boundary 648 of the hydrate stability field. The pipe(s) 640, which are screened or otherwise configured to prevent hydrate from entering them, deliver fresh water released from the hydrate to fresh water accumulation region 666. A gray water return pipe 650 allows denser, more saline gray water to flow back down into the saline fluid below the fresh water/saline water interface 644. More highly saline residual water and/or negatively buoyant hydrate is drawn from the sump 654 and processed or removed as at 658, as in previously described embodiments. Output fresh water, some of which may be returned to the fluid removal section for purposes of washing interstitial saline water as described above (not shown), is drawn off at 660, near the top of the fresh water accumulation region 666 and well above the physical barrier 610.

It is contemplated that the physical barrier 610, the fresh water and gray water return pipes 640, 650, and the heat exchanger in the dissociation/heat exchange section 630 may be configured such that their positions can be varied, thereby permitting different hydrate-forming liquids, gases, or gas mixtures to be used in the same installation. The physical barrier 610 and heat exchanger might be vertically adjustable, whereas a series of bypass and return pipes 640, 650 having different inlet locations can be provided and opened and closed remotely using suitable inlet and outlet valves. In this manner, changing from one hydrate-forming substance to another can be effected very quickly and conveniently.

By holding and fully processing for re-injection the hydrate-forming gas while it is still under pressure, considerable economies of operation can be achieved. The variation in the pressure of the liquid or gas, from that required for formation of the hydrate down to that at which fresh water is released from the hydrate, can be kept to a minimum. This, in turn, minimizes the energy cost associated with pumping the captured hydrate-forming gas from above the dissociation/heat exchange section back down to the hydrate-forming section at the base of the apparatus, particularly considering the fact that, percentagewise, the greatest change of pressure in a hydraulic column (such as any of the above-described embodiments) takes place in the upper portions of the column. Moreover, the volume of the gas to be handled (and accordingly the size of the gas handling equipment and facility) will also be reduced significantly.

As an alternative (not shown) to the configuration shown in FIG. 15, the upper part of the desalination fractionation column can be sealed and pressurized by means of an associated hydraulic standpipe, thereby causing pressures within the apparatus near the surface to be equivalent to the pressure-height of the standpipe. Where the standpipe is implemented in tall structures (such as adjacent buildings near the desalination facility), relatively high pressures can be created in the topmost part of the dissociation/heat exchange section, which is at ground level.

In further embodiments of the invention, the water may be desalinated or purified in self-contained, mechanically pressurized vessels. Such embodiments offer a number of distinct advantages, including the fact that the installations can be of various sizes and shapes to suit local conditions, containment constraints, and fresh water requirements. Moreover, whereas the previously described embodiments are relatively large-scale and therefore are of a fixed, permanent nature, self-contained, pressurized embodiments can be more temporary in nature in terms of their construction and their location. Individual pressurized installations can occupy relatively small spaces and produce fresh water efficiently, even in low volumes. Such installations can be fabricated at central manufacturing facilities and installed on site with a minimum of local site construction, which site might be a building or even a ship or other mobile platform.

Figure 16:
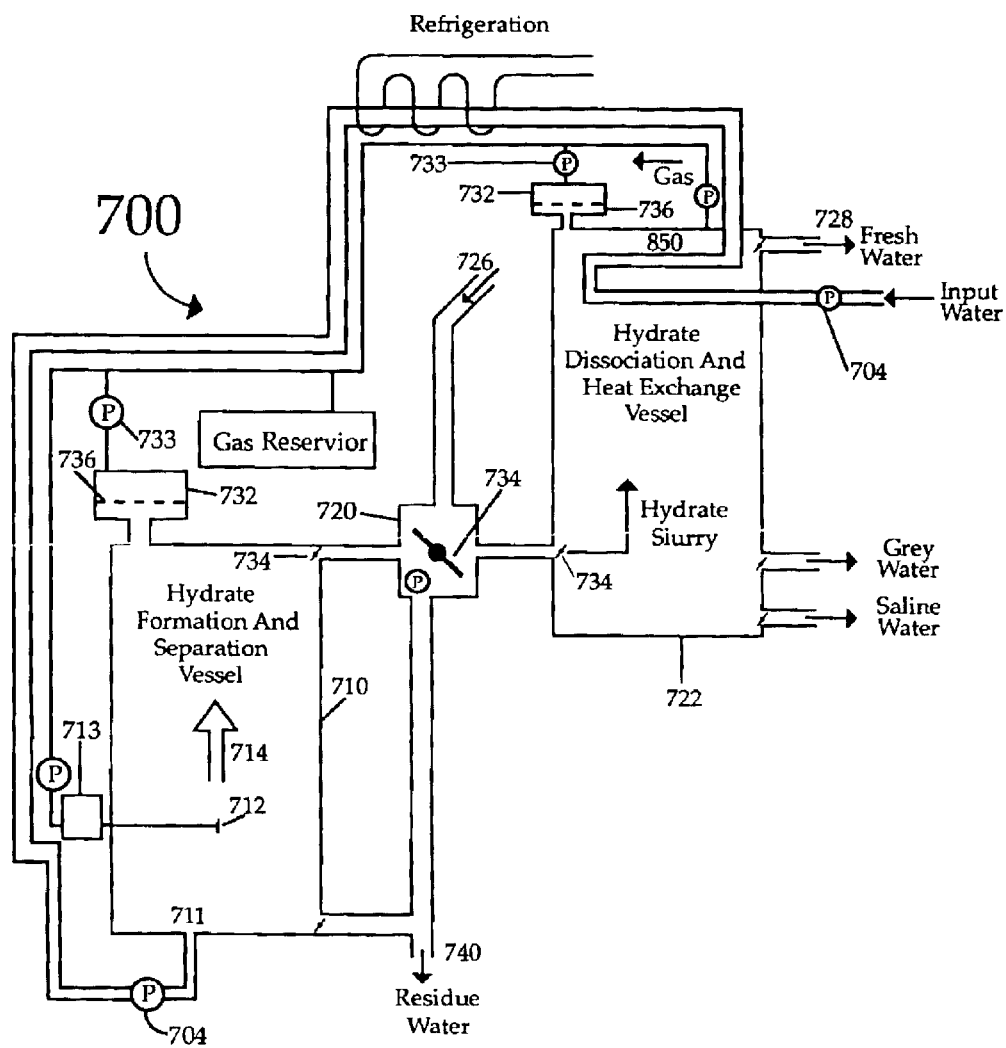
FIG. 16 is a diagrammatic, side elevation view of an embodiment of a mechanically pressurized desalination system configured to use positively buoyant hydrate.

A mechanically pressurized installation configured to use positively buoyant hydrate to extract fresh water from water is illustrated in FIG. 16. Input water is pumped and pressurized from input pressure to the operating system pressure by pump 704. The water enters the pressurized hydrate formation and separation vessel 710 at water input 711, and a suitable, positively buoyant hydrate-forming substance is injected at injection point 712. (Means 713 for liquifying certain gases are provided where this is advantageous to the desalination process.) Positively buoyant hydrate 714 spontaneously forms and rises through the residual water, as in previously described embodiments, to the top of the vessel 710 where it accumulates and concentrates.

The buoyant hydrate slurry is subsequently admitted into transfer and washing section 720, and then into the dissociation/heat exchange vessel 722. (Flow of the hydrate slurry is regulated by valves 734.) While in the transfer and washing section 720, the hydrate may be washed of the residual, intergranular saline fluid using fresh water 726 tapped from the fresh water output 728. More than one wash cycle may be used to completely flush residual fluid, although the number of washings will depend on the effectiveness of separation through fractionation (which may vary for different gases and gas mixtures) and the nature of the crystalline fraction of the slurry. In some cases, no washing may be necessary.

Pressure is maintained in the hydrate formation and separation vessel 710 and in the dissociation/heat exchange vessel 722 by pressure balance reservoir systems 732 (one for each vessel), and movement of fluid from one vessel to the other is controlled by varying pressure and using the in-line valves 734, which, when closed, keep the hydrate formation and separation vessel 710 and the hydrate dissociation/heat exchange vessel 722 in barometric and hydraulic isolation with respect to each other. In other words, as will be appreciated by one having skill in the art, net movement of fluid from one vessel to the other, when permitted by the in-line valves 734, will be a result of the net pressure difference between the two vessels, i.e., across the in-line valves 734. The systems 732 each have a pressure pump 733 and a diaphragm or gas-fluid interface 736, which are used to raise and lower pressure in each vessel. Pressure in the vessels is controlled so that the hydrate remains stable as hydrate until it is finally collected and concentrated at the top of the dissociation vessel 722. This is because premature dissociation will release considerable amounts of gas and therefore will cause undesired mixing. Moreover, pressure conditions in the dissociation vessel should be controlled to minimize turbulence in the fluid-gas mixture and to promote efficient separation of saline and fresh water.

The dissociation and heat exchange vessel 722 may be constituted by a number of linked, heat-exchanging devices in a number of different water treatment chambers. The actual size, throughput, etc. will depend on the overall system production rate which, in turn, will depend on the temperature of the input water, the particular liquid, gas, or gas mixture used to form the hydrate, the rate at which heat can be removed from the system, etc. Fractionation, concentration, separation, drying, and re-use of the hydrate-forming gas takes place in the same manner as in the previously described embodiments. Additionally, heat produced by liquifying hydrate-forming gas can be absorbed and removed using heat exchangers containing residue or saline fluids.

It will be appreciated that the mechanically pressurized process is inherently less continuous than the previously described embodiments and is essentially a batch process. Pressure in the system is controlled so as to simulate the pressure variation in the previously described embodiments: the water to be treated is pressurized and injected into the apparatus, and then pressure is raised and lowered to control the rate of the hydrate formation and dissociation reactions.

Mechanically pressurized embodiments provide increased versatility in that pressures may be controlled to provide the optimum pressures for formation of hydrate and to control the rate of dissociation. Moreover, different liquids, gases, and gas mixtures can be used within the same apparatus, and the same water can be processed more than once using different liquids, gases, and gas mixtures.

Figure 17:
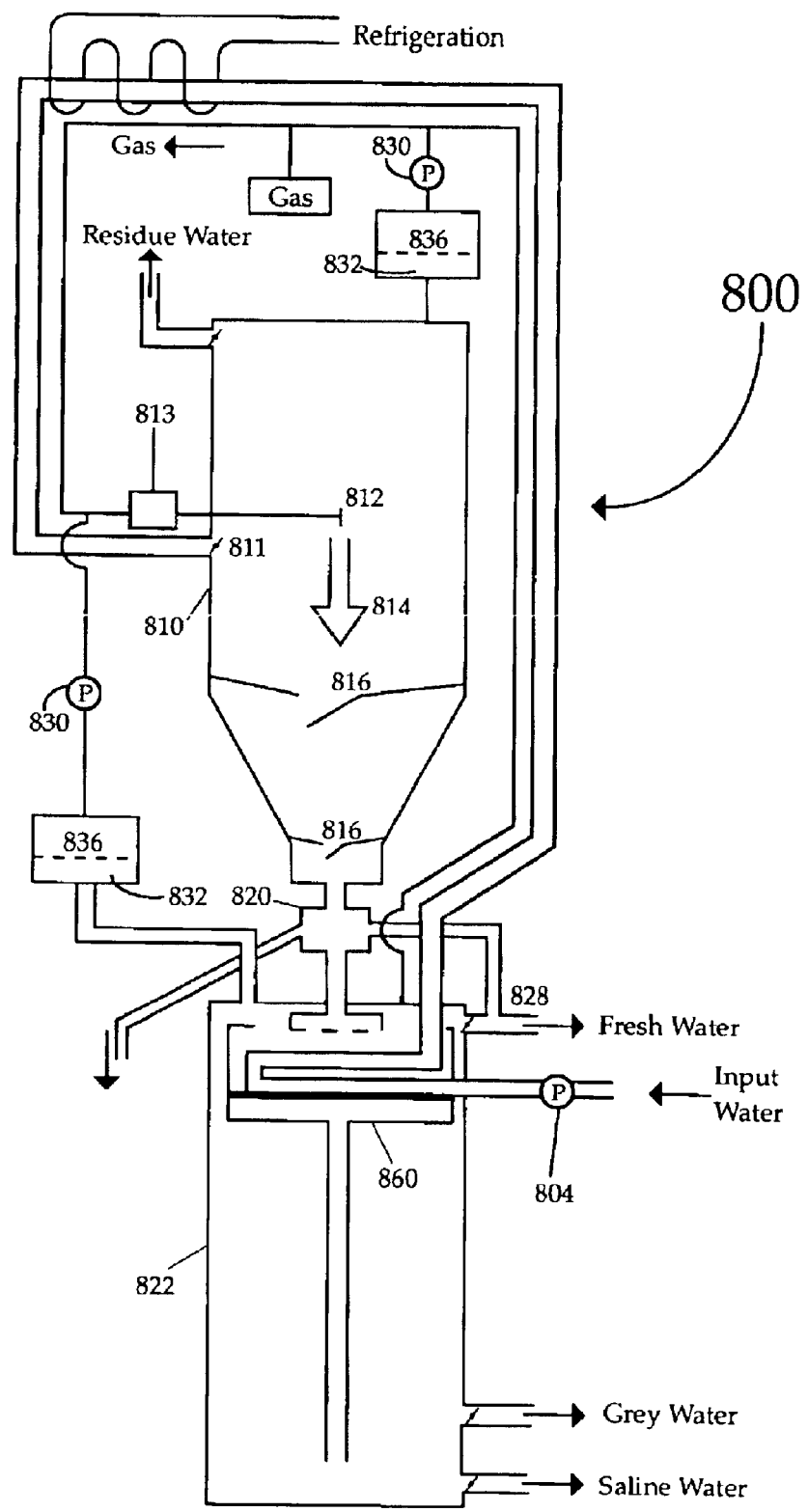
FIG. 17 is a diagrammatic, side elevation view of an embodiment of a mechanically pressurized desalination system which is similar to that shown in FIG. 16 but which is configured to use negatively buoyant hydrate.

A further mechanically pressurized embodiment 800, which embodiment utilizes negatively buoyant hydrate to extract fresh water from water to be treated, is shown in FIG. 17. Input water is pumped from input pressure up to the operating system pressure and into the pressurized hydrate formation and separation vessel 810 by pumps 804, and a suitable, negatively buoyant hydrate-forming gas is injected at injection point 812. (Means 812 for liquifying certain gases may be provided.) Negatively buoyant hydrate 814 spontaneously forms and sinks through the residual water, as described in connection with previously described negatively buoyant hydrate embodiments, and collects and concentrates in gated sump isolation sections 816, which are configured to maintain the hydrate formation and separation vessel 810 and the dissociation/heat exchange vessel 822 in barometric and hydraulic isolation with respect to each other and thus function as flow-controlling valves. In particular, the gated sump isolation sections 816 are opened and closed to control net passage of the negatively buoyant hydrate therethrough as a result of or due to the net pressure difference between the two vessels (as well as under the influence of gravity, to a much lesser extent).

As in the previously described mechanically pressurized embodiment, pressure is maintained in the system by pressure balance reservoir systems 832 (one for each vessel), and movement of the fluid can be controlled by varying the pressure in the system compartments. Pressure pumps 830 and diaphragms or gas-fluid interfaces 836 are used to raise and lower pressure in each vessel independently.

As the hydrate slurry passes through the transfer and washing section 820 and into the dissociation/heat exchange vessel 822, it may be washed of the residual, intergranular saline fluid with fresh water tapped from the fresh water output 828, which removes salt from the hydrate slurry prior to dissociation.

Subsequently, the hydrate is permitted to flow downward from the transfer and washing section 820, and into the hydrate dissociation and heat exchange vessel 822, where is dissociates and fresh, gray, and saline water are removed. Heat exchange between the input water and the dissociating hydrate slurry occurs as described in previous embodiments. Dissociation takes place under controlled pressure conditions to minimize turbulence in the fluid-gas mixture and to promote efficient separation of saline and fresh water.

Preferably, a slurry holder and fluid separator tank 860 is provided in the upper part of the dissociation/heat exchange vessel 822 and is similar in construction to that described above and shown in FIGS. 12 and 13. The tank 860 minimizes mixing of fresh and saline water by providing a conduit for the residual saline water to sink to the bottom of the vessel, which conduit isolates the saline water from the lower density fresh water.

As in the case of the mechanically pressurized, positively buoyant hydrate embodiment, the dissociation and heat exchange vessel 822 may be constituted by a number of linked, heat-exchanging devices in a number of different water treatment chambers. The actual size, throughput, etc. will depend on the production rate which, in turn, will depend on the temperature of the input water, the particular liquid, gas, or gas mixture used to form the hydrate, the rate at which heat can be removed from the system, etc. Fractionation, concentration, separation, drying, and re-use of the hydrate-forming substance takes place in the same manner as in the previously described embodiments.

Figure 18:
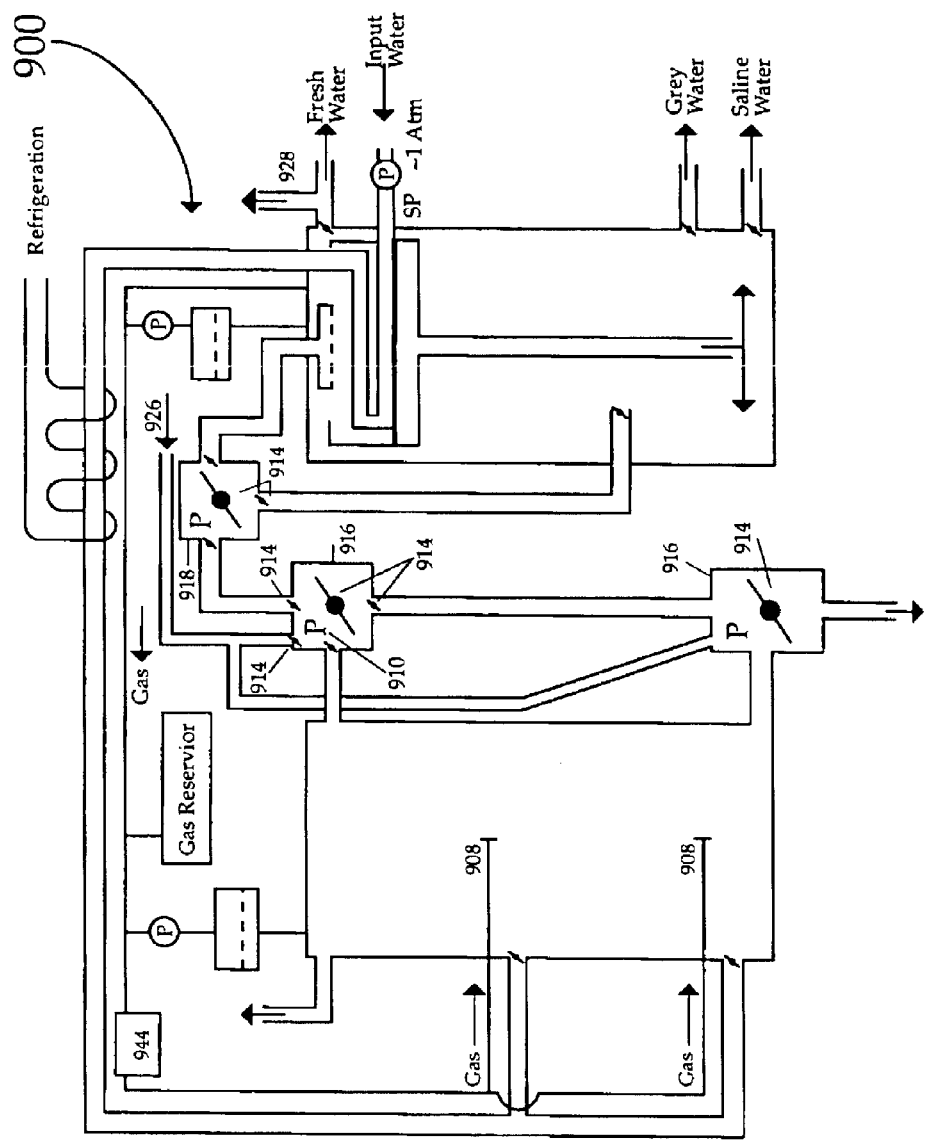
FIG. 18. is a diagrammatic, side elevation view of an embodiment of a mechanically pressurized desalination system configured to use either positively or negatively buoyant hydrate.

Another embodiment 900, which embodiment provides greater versatility by using either positively or negatively buoyant hydrate to extract fresh water from seawater or polluted water, is shown in FIG. 18. Pumps P and in-line valves 914 are provided throughout the system. Operation, depending on the particular hydrate-forming substance used, is as described in the pressurized vessel installations using either positively or negatively buoyant gas hydrate.

This embodiment is particularly useful where the gas or gas mixture supply is uncertain as a variety of gases may be used. Embodiments of this type could be useful in disaster relief or in expeditionary military activity, or at any place where a temporary supply of fresh water is required without a significant construction requirement. This embodiment contains all the attributes of both the positive and negative buoyancy hydrate, mechanically pressurized desalination fractionation embodiments, including use of fresh water 926 from the fresh water output 928 to flush residual saline water. Multiple liquid or gas injection points 908 are provided (within the mechanically pressurized hydrate formation and separation vessel), as is provision for handling either positively or negatively buoyant hydrate. In particular, multiple pumping units P and fluid control valves 914 (which keep the mechanically pressurized hydrate formation and separation vessel and the mechanically pressurized hydrate dissociation/heat exchange vessel in barometric and hydraulic isolation with respect to each other) are provided to direct and control the flow of fluids and hydrate slurries in fluid control and washing units 916 and hydrate slurry control units 918. The gas processing system 944 includes means for liquifying certain recovered gases and gas mixtures.

As in the above-described embodiments in which the weight of the column of water generates the requisite pressures, any of the mechanically pressurized vessel installations may be simplified by feeding the input water into the system without passing it through the dissociation section for heat exchange. More artificial refrigeration will need to be provided, but operation will otherwise be the same as for the positive and negative buoyancy hydrate embodiments shown in FIGS. 16 and 17 and the "combined" pressurized apparatus as shown in FIG. 18.

Figure 19:
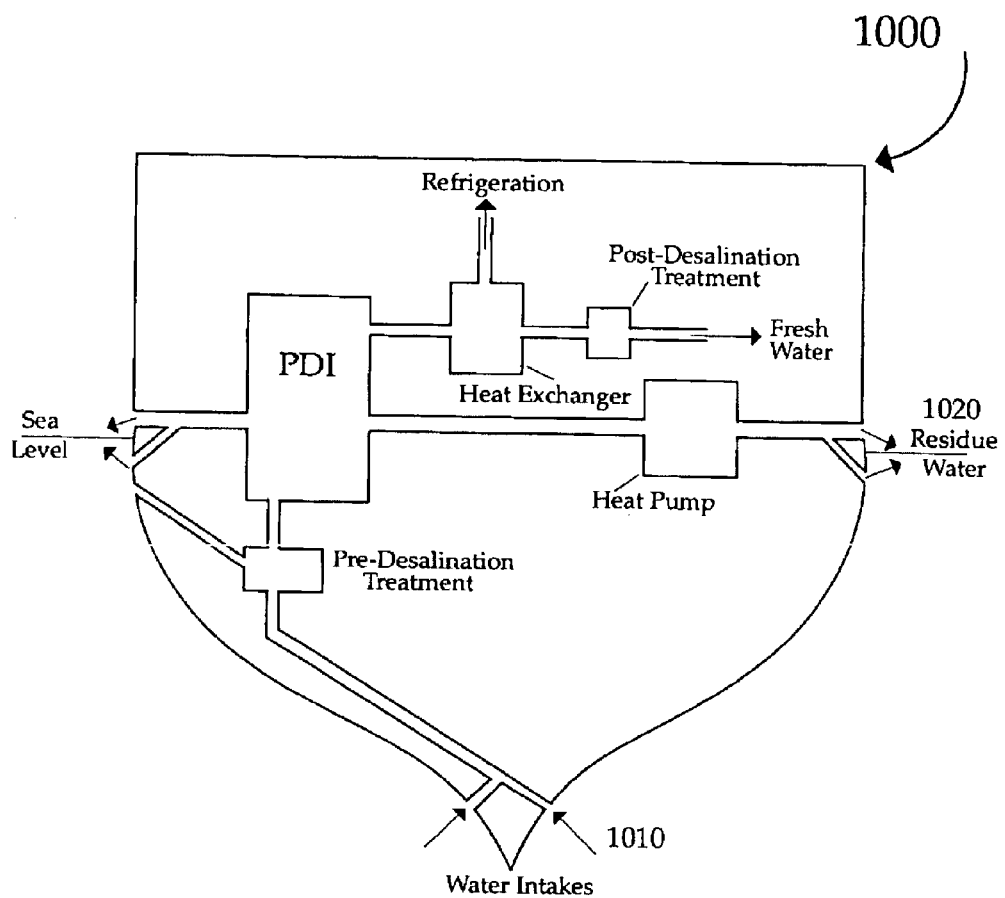
FIG. 19 is a generalized, diagrammatic depiction of a mechanically pressurized desalination system located on a ship.

As noted above, mechanically pressurized embodiments of the invention may be extremely mobile. In the case of a ship-borne installation (FIG. 19), for example, water to be treated is processed as described in previous embodiments, but in a smaller and more compact installation built right on board the ship 1000.

Negatively buoyant hydrate formed from a liquid or gas (such as carbon dioxide) that is non-combustible at the pressures and temperatures of this system and the surrounding ambient conditions is preferred, especially where installations are placed in ships or where the handling of combustible gases constitutes a hazard.

In the ship-borne embodiment, some of the heat produced by the hydrate formation reaction is extracted by heat exchangers in the hydrate formation and concentration vessel, which is possible because of the immediate access to seawater. Further heat is extracted from the hydrate slurry in the hydrate slurry transfer system. This pre-dissociation heat extraction maximizes the cooling effect of the hydrate dissociation because removing heat in addition to that removed with the residual treated fluid allows dissociation to begin with the hydrate slurry at a lower temperature than would exist otherwise. Thus, the fresh water produced will be significantly cooled. This cooled water can be used to absorb heat and hence can be used to provide refrigeration or air-conditioning. The fresh water is treated as described in previous embodiments, and warmed residual water may be used as a low-grade heat source (although it is more likely to be pumped back to the sea).

Installation aboard a ship is ideal for the mechanically pressurized hydrate fractionation method of desalination. This is because the residual treated water can be returned to the sea immediately, thereby maximizing efficiency of the heat-removal process. The water intake for the desalination ideally would be placed as low on the keel 1010 of the ship as possible to separate intake and residual water return and to minimize uptake of pollutants, which in the case of oil-based products and many industrial chemicals either float or are usually found in increasing proportion closer to the sea surface.

Aboard ship, the return fluid can have multiple outlets 1020, which allows it to be returned to the sea closer to the surface where the warmer water will float well away from the water intake. In addition, movement of the ship creates considerable turbulence which will promote mixing of the residual water and near-surface water when the ship is under way. When the ship is tied up, water from a shore source can be used or the system can be recycled with fresh water to minimize residual water return, and the desalination fractionation system can be operated at a minimal level, i.e., at a level just sufficient for the thermal balance required for normal operation to be attained quickly. Where the ship is moored or otherwise maintaining a static position, the residual water can be returned to the sea directly. Wind and tide can be taken into consideration to select the return outlet utilized so as to minimize environmental impact and allow the residual water to be carried away from the ship most efficiently.

Similar compact installations can be fabricated as prepackaged components that can be airlifted or easily flown and trucked to a particular site—for instance, immediately following a disaster such as an earthquake—and assembled rapidly. Where temporary or mobile installations are operated, more compact versions of the intake, outfall, and gas processing apparatus similar to that described for FIG. 1 are employed. These can be specially designed for light weight, ease of deployability, and ability to operate in a variety of conditions. Power generating units or power cables suitable for drawing electricity from any inshore powerboat or other supply are also part of the mobile apparatus, and possibly also part of larger temporary facilities.

Pressurized vessel desalination fractionation installations can also be mounted on standard pallets for shipment in aircraft or ships or in standard commercial shipping containers (for which cargo handling equipment exists worldwide) to facilitate air and road travel. They can be mounted on vehicles or set up on a pier, or anywhere near seawater or other water to be desalinated or purified.

Finally, once the seawater has been cycled through the pressurized vessel desalination fractionation column and downstream processing applications a desired number of times, the residual seawater is simply pumped back to sea or retained for those who desire it.

Although particular and specific embodiments of the invention have been disclosed in some detail, numerous modifications will occur to those having skill in the art, which modifications hold true to the spirit of this invention. Such modifications are deemed to be within the scope of the following claims.

I claim the following:

1. An apparatus for desalinating or purifying saline or polluted input water, respectively, using positively buoyant hydrate to do so, said apparatus comprising:
   a mechanically pressurized hydrate formation vessel including a pressurization system by means of which said hydrate formation vessel is pressurized;
   a mechanically pressurized hydrate dissociation vessel; including a pressurization system by means of which said hydrate dissociation vessel is pressurized; and
   a valve system operatively disposed between said hydrate formation vessel and said hydrate dissociation vessel, which valve system is operable to keep said hydrate formation vessel and said hydrate dissociation vessel in barometric and hydraulic isolation with respect to each other when closed and which valve system is operable to control communication of fluid from said hydrate formation vessel into said hydrate dissociation vessel;
   wherein the mutual arrangement of said hydrate formation vessel, said valve system, and said hydrate dissociation vessel being is such that positively buoyant hydrate formed in said hydrate formation vessel moves automatically from said hydrate formation vessel toward said hydrate dissociation vessel as a result of or due to a net pressure difference between said hydrate formation vessel and said hydrate dissociation vessel when said valve system operates to permit movement of said positively buoyant hydrate;
   said apparatus further comprising an input water supply conduit configured to provide said input water to said hydrate formation vessel;
   a hydrate-forming substance supply conduit configured to provide a positively-buoyant-hydrate-forming substance to said hydrate formation vessel;
   a fresh water output conduit configured and disposed for removal from said hydrate dissociation vessel of fresh water released by hydrate dissociating therein; and
   a saline water output conduit configured and disposed for removal from said hydrate formation vessel of interstitial residual saline water or gray water.

2. The apparatus of claim 1, wherein said apparatus is a constituent component of a ship and wherein said input water supply conduit includes a water intake port that is formed along a lower portion of said ship's hull and that is located below the waterline of said ship.

3. The apparatus of claim 2, wherein said saline water output conduit includes a water outlet that is formed in said ship's hull.

4. An apparatus for desalinating or purifying saline or polluted input water, respectively, using positively buoyant to do so, said apparatus comprising:
   a mechanically pressurized hydrate formation vessel including a pressurization system by means of which said hydrate formation vessel is pressurized;
   a mechanically pressurized hydrate dissociation vessel, including a pressurization system by means of which said hydrate dissociation vessel is pressurized; and
   a valve system operatively disposed between said hydrate formation vessel and said hydrate dissociation vessel, which valve system is operable to keep said hydrate formation vessel and said hydrate dissociation vessel in barometric and hydraulic isolation with respect to each other when closed and which valve system is operable to control communication of fluid from said hydrate formation vessel into said hydrate dissociation vessel;
   wherein the mutual arrangement of said hydrate formation vessel, said valve system, and said hydrate dissociation vessel being is such that negatively buoyant hydrate formed in said hydrate formation vessel moves automatically from said hydrate formation vessel toward said hydrate dissociation vessel as a result of or due to a net pressure difference between said hydrate formation vessel and said hydrate dissociation vessel when said valve system operates to permit movement of said positively buoyant hydrate;
   said apparatus further comprising an input water supply conduit configured to provide said input water to said hydrate formation vessel;
   a hydrate-forming substance supply conduit configured to provide a negatively-buoyant-hydrate-forming substance to said hydrate formation vessel;
   a fresh water output conduit configured and disposed for removal from said hydrate dissociation vessel of fresh water released by hydrate dissociating therein; and
   a saline water output conduit configured and disposed for removal from said hydrate formation vessel of interstitial residual saline water or gray water.

5. The apparatus of claim 4, wherein said apparatus is a constituent component of a ship and wherein said input water supply conduit includes a water intake port that is formed along a lower portion of said ship's hull and that is located below the waterline of said ship.

6. The apparatus of claim 5, wherein said saline water output conduit includes a water outlet that is formed in said ship's hull.

7. An apparatus for desalinating or purifying saline or polluted input water, respectively, using positively buoyant to do so, said apparatus comprising:
   a mechanically pressurized hydrate formation vessel including a pressurization system by means of which said hydrate formation vessel is pressurized;

a mechanically pressurized hydrate dissociation vessel including a pressurization system by means of which said hydrate dissociation vessel is pressurized;

a multiple-valve system operatively disposed between said hydrate formation vessel and said hydrate dissociation vessel, which multiple-valve system is operable to keep said hydrate formation vessel and said hydrate dissociation vessel in barometric and hydraulic isolation with respect to each other when closed and which multiple-valve system is operable to control communication of fluid from said hydrate formation vessel into said hydrate dissociation vessel; and a pump wherein the mutual arrangement of said hydrate formation vessel, said hydrate dissociation vessel, said multiple-valve valve system, and said pump is such that 1) positively buoyant hydrate formed in said hydrate formation vessel moves automatically from said hydrate formation vessel toward and into said hydrate formation vessel and said hydrate dissociation vessel when said multiple-valve valve system operates to permit movement of said positively buoyant hydrate; and 2) negatively buoyant hydrate formed in and settled in said hydrate formation vessel is pumped by said pump toward said hydrate dissociation vessel;

said apparatus further comprising an input water supply conduit configured to provide said input water to said hydrate formation vessel;

a hydrate-forming substance supply conduit configured to provide a negatively-buoyant-hydrate-forming substance to said hydrate formation vessel;

a fresh water output conduit configured and disposed for removal from said hydrate dissociation vessel of fresh water released by hydrate dissociating therein; and a saline water output conduit configured and disposed for removal from said hydrate formation vessel of interstitial residual saline water or gray water.

8. The apparatus of claim 7, wherein said apparatus is a constituent component of a ship and wherein said input water supply conduit includes a water intake port that is formed along a lower portion of said ship's hull and that is located below the waterline.

9. The apparatus of claim 8, wherein said saline water output conduit includes a water outlet that is formed in said ship's hull.

* * * * *

UNITED STATES PATENT AND TRADEMARK OFFICE
CERTIFICATE OF CORRECTION

PATENT NO.    : 6,733,667 B2
DATED         : May 11, 2004
INVENTOR(S)   : Michael David Max It is certified that error appears in the above-identified patent and that said Letters Patent is hereby corrected as shown below:

Title page,
Item [56], References Cited, U.S. PATENT DOCUMENTS, replace "6,106,592 A 8/2000 Paranjpe et al." with -- 6,106,595 9/2000 Spencer --.
OTHER PUBLICATIONS, replace "Viahakis et al.,...." with -- Viahakis et al., "The Growth Rate of Ice Crystals: The Properties of Carbon Dioxide Hydrate A review of Properties of 51 Gas Hydrates," Research and Development Progress Report No. 830, Dept of Interior, PB-217-615, (November 1972). --; replace "Database WPI, Section Ch..." with -- Database WPI, Section Ch, Week 1988 12, Derwent Publications Ltd, London, GB: Class D15, AN 1988-082320, XP002143497 & SU 1 328 298 A (Odessa Refrig Ind Res), 7 August 1987, (abstract) --; replace "EPO-Patent Abstract of Japan Publication No. 61136481 ..." with -- EPO-Patent Abstracts of Japan Publication No. 61136481, publication date 24-06-86, Muneschichi, Concentration of Aqueous Solution English Language abstract --.

Signed and Sealed this

Seventh Day of December, 2004

JON W. DUDAS
*Director of the United States Patent and Trademark Office*